(12) United States Patent
Nakagawa et al.

(10) Patent No.: US 10,259,965 B2
(45) Date of Patent: Apr. 16, 2019

(54) SURFACE TREATMENT LIQUID COMPOSTION, INK SET, RECORDING METHOD, AND RECORDING DEVICE

(71) Applicants: Tomohiro Nakagawa, Kanagawa (JP); Noriaki Okada, Kanagawa (JP); Atsufumi Hanazawa, Tokyo (JP); Juichi Furukawa, Kanagawa (JP); Satoyuki Sekiguchi, Kanagawa (JP); Yukihiro Imanaga, Tokyo (JP); Ayaka Tanaka, Kanagawa (JP)

(72) Inventors: Tomohiro Nakagawa, Kanagawa (JP); Noriaki Okada, Kanagawa (JP); Atsufumi Hanazawa, Tokyo (JP); Juichi Furukawa, Kanagawa (JP); Satoyuki Sekiguchi, Kanagawa (JP); Yukihiro Imanaga, Tokyo (JP); Ayaka Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/436,256

(22) Filed: Feb. 17, 2017

(65) Prior Publication Data

US 2017/0247561 A1   Aug. 31, 2017

(30) Foreign Application Priority Data

Feb. 25, 2016   (JP) .................................. 2016-034407
Dec. 15, 2016   (JP) .................................. 2016-243438

(51) Int. Cl.
*C09D 11/54*   (2014.01)
*B41J 11/00*   (2006.01)
*C09D 123/08*  (2006.01)
*C08K 5/098*   (2006.01)

(52) U.S. Cl.
CPC .......... *C09D 11/54* (2013.01); *B41J 11/0015* (2013.01); *C09D 123/0853* (2013.01); *C08K 5/098* (2013.01)

(58) Field of Classification Search
None
See application file for complete search history.

(56) References Cited

U.S. PATENT DOCUMENTS

| | | | |
|---|---|---|---|
| 2009/0220751 A1* | 9/2009 | Warner | A61F 13/15203 428/195.1 |
| 2010/0196603 A1 | 8/2010 | Ohshima et al. | |
| 2012/0320137 A1 | 12/2012 | Fujii et al. | |
| 2013/0070036 A1 | 3/2013 | Ooishi | |

(Continued)

FOREIGN PATENT DOCUMENTS

| | | |
|---|---|---|
| EP | 2 233 634 A1 | 9/2010 |
| JP | 11-349873 | 12/1999 |
| JP | 2005-047076 | 2/2005 |

(Continued)

OTHER PUBLICATIONS

IP.com search (Year: 2018).*
Extended European Search Report dated Apr. 5, 2017 in Patent Application No. 17155908.1.

*Primary Examiner* — Lisa Solomon
(74) *Attorney, Agent, or Firm* — Oblon, McClelland, Maier & Neustadt, L.L.P.

(57) ABSTRACT

A surface treatment liquid composition for a substrate includes a nonionic resin particle and a multivalent metal salt.

19 Claims, 9 Drawing Sheets

(56) References Cited

U.S. PATENT DOCUMENTS

2015/0239261 A1* 8/2015 Sugiyama ................ C08K 3/16
  347/21
2015/0274992 A1* 10/2015 Aoyama ................ C09D 11/38
  347/21

FOREIGN PATENT DOCUMENTS

| JP | 2008-290292 | 12/2008 |
| JP | 2015-071738 | 4/2015 |

* cited by examiner

SURFACE TREATMENT LIQUID COMPOSTION, INK SET, RECORDING METHOD, AND RECORDING DEVICE

CROSS-REFERENCE TO RELATED APPLICATIONS

This patent application is based on and claims priority pursuant to 35 U.S.C. § 119 to Japanese Patent Application Nos. 2016-034407 and 2016-243438, filed on Feb. 25, 2016 and Dec. 15, 2016, respectively, in the Japan Patent Office, the entire disclosures of which are hereby incorporated by reference herein.

BACKGROUND

Technical Field

The present invention relates to a surface treatment liquid composition, an ink set, a recording method, and a recording device.

Description of the Related Art

Since inkjet printers are relatively quiet, enjoy low running costs, and are capable of easily printing color images, they are now widely used at home as an output device of digital signals.

Technologies of printing images on packaging materials for food, beverages, commodities, etc. utilizing inkjet have also been developed.

As the substrate to which inkjet recording is applied, non-absorbable substrate such as plastic film have been used and inks have been developed for such substrates.

Demands to directly print images, etc. on plastic film utilizing inkjet include, for example, package printing for food and commodities. In such applications, printed substrates are often visually observed at close range, so that extremely high image quality is demanded.

However, when images etc. are printed on a non-absorbable substrate utilizing inkjet, permeation drying does not occur. Therefore, ink droplets excessively wide-spread to areas of outline characters (also referred to as negative characters), thereby rendering the characters illegible. This phenomenon of rendering characters illegible is referred to as "crushed negative characters".

To solve this problem, technologies have been proposed which include applying a reaction liquid including a flocculant and an ink including a coloring material to a non-absorbable recording medium in this sequence.

Charge repulsion type resin emulsions, which are typically used as a surface treatment liquid composition, are not securely dispersed under the coexistence with multivalent metal salts. That is, there is no surface treatment liquid composition for a substrate, which has excellent storage stability over a long period of time yet.

In addition, in most of the package applications, an additive is applied onto a print layer after printing on the reverse side of plastic film and thereafter a heat sealable film is attached for lamination processing to manufacture a package material. Also, there is no primer capable of demonstrating lamination strength at a non-print portion where the primer is exposed or a print portion where the primer is covered with ink.

Moreover, customers on the market and food manufacturers tend to demand higher and higher image density. To meet this demand, it is possible to increase the attachment amount of ink but liquid on a film does not dry, which has a large adverse impact on the productivity as a printer. That is, a trade-off between the high image density and the productivity occurs.

Furthermore, film may be damaged during conveyance or due to vibration during conveyance before lamination. Also, in the case of surface printing without lamination, the print layer is scraped off due to friction caused by direct contacts with the print layer of an adjacent package, box, etc. As a result, the print content may be unclear and illegible. Therefore, friction resistance is required as well.

As the liquid discharging head (liquid droplet discharging head) to discharge liquid, a circulation type head is known in which liquid is circulated in a plurality of individual liquid chambers.

For example, a circulation type head has been proposed which includes a common liquid chamber to supply liquid to each of individual liquid chambers serving as pressure generating chambers and a circulation common liquid chamber communicating with a circulation flow path communicating with each of the individual liquid chambers. The common liquid chamber and the circulation common liquid chamber are formed of a flow path member formed of a plurality of plate-like members forming the individual liquid chambers and the circulation flow path.

SUMMARY

According to the present invention, provided is an improved surface treatment liquid composition for a substrate including a nonionic resin particle and a multivalent metal salt.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
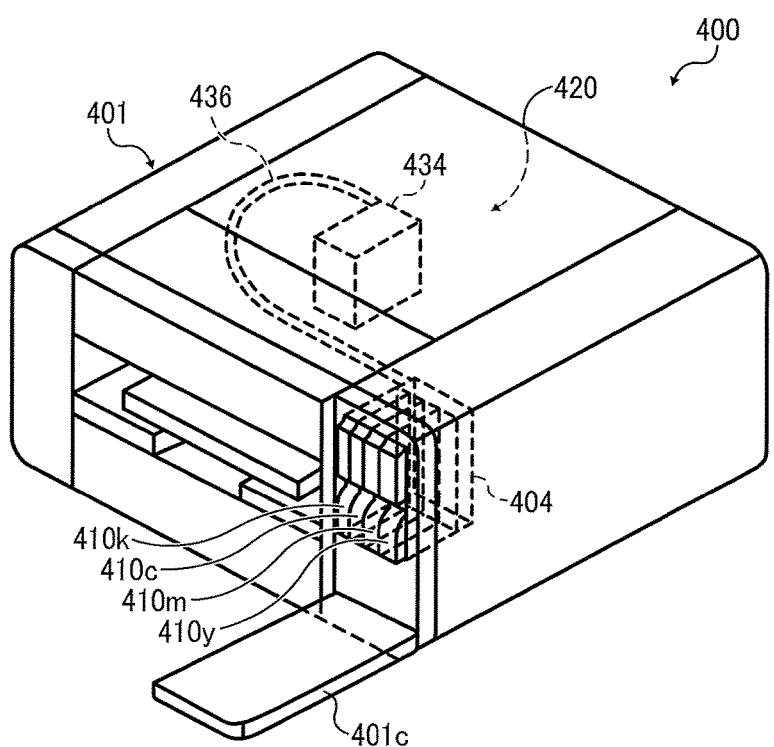
FIG. 1 is a diagram illustrating the recording device according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The present disclosure relates to the surface treatment liquid composition described in embodiment 1 below.

1. A surface treatment liquid composition for a substrate includes a nonionic resin particle and a multivalent metal salt.

The present disclosure will be described below in detail with reference to several embodiments and accompanying drawings. The embodiment 1 of the present disclosure includes the following 2 to 16. Therefore, these are also described.

2. The surface treatment liquid composition according to 1 mentioned above, wherein the nonionic resin particle includes at least one of a polyolefin resin, a polyvinyl acetate resin, a polyvinyl chloride resin, a urethane resin, a styrene butadiene resin, and a copolymers thereof.

3. The surface treatment liquid composition according to 1 or 2 mentioned above, wherein the multivalent metal salt includes at least one of a calcium salt, a magnesium salt, a nickel salt, and an aluminum salt.

4. The surface treatment liquid composition according to 3 mentioned above, wherein the aluminum salt includes aluminum sulfate, aluminum phosphate, polyaluminum chloride, and aluminum potassium sulfate.

5. The surface treatment liquid composition according to any one of 1 to 4 mentioned above, wherein the nonionic resin particle accounts for 0.5-20 percent by mass of the surface treatment liquid composition.

6. An ink set including the surface treatment liquid composition of claim 1; and one or more inks, each ink including a coloring material.

7. The ink set according to 6 mentioned above, wherein the ink includes a non-white coloring material having a volume average particle diameter of from 30 to 110 nm and a thermoplastic resin particle.

8. The ink set according to 6 mentioned above, wherein the ink includes a white coloring material and a thermoplastic resin particle.

9. The ink set according to 6 mentioned above, wherein the ink includes a non-white ink including a non-white coloring material having a volume average particle diameter of from 30 to 110 nm and a thermoplastic resin particle and a white ink including a white coloring material and a thermoplastic resin particle.

10. The ink set according to any one of 7 to 9 mentioned above, wherein at least one ink of the non-white ink and the white ink has a ratio (R/P) of a mass ratio (R) of the thermoplastic resin particle to the at least one ink of the non-white ink and the white ink to a mass ratio (P) of the coloring material to the at least one ink of the non-white ink and the white ink is 0.5-3.0.

11. The ink set according to any one of 7 to 10 mentioned above, the glass transition temperature $Tg1$ of the nonionic resin particle of the surface treatment liquid composition is lower than the glass transition temperature $Tg2$ of the resin particle of the ink.

12. A recording method including applying the surface treatment liquid composition of the ink set of any one of 6 to 11 to a substrate and printing by discharging the ink of the ink set of any one of 6 to 11 to the substrate.

13. The recording method according to 12 mentioned above, further including reforming the surface of the substrate.

14. The recording method according to 12 or 13 mentioned above, wherein the ink is discharged by an ink discharging head including a nozzle configured to discharge the ink, a plurality of individual liquid chambers communicating with the nozzle, a flow-in path configured to flow the ink into the individual liquid chambers, a flow-out path configured to flow the ink out of the individual liquid chambers and the step of printing further includes circulating the ink from the flow-out path to the flow-in path.

15. A recording device including an ink accommodating unit configured to include the ink set of any one of 6 to 11 mentioned above and an ink discharging head configured to discharge the ink of the ink set.

16. The recording device according to 15 mentioned above, wherein the ink discharging head includes a nozzle to discharge the ink, a plurality of individual liquid chambers communicating with the nozzle, a flow-in path to flow the ink into the individual liquid chambers, a flow-out path to flow the ink out of the individual liquid chambers and a circulating device to circulate the ink from the flow-out path to the flow-in path.

The surface treatment liquid composition to treat the surface of a substrate includes a nonionic resin particle and a multivalent metal salt. The surface treatment liquid composition, however, significantly includes no coloring material. "Significantly includes no coloring material" means no coloring material is added as a component of the surface treatment liquid composition (hereinafter also referred to as liquid composition).

The present inventors have found that non-charge repulsion type emulsion but nonionic resin particles dispersed due to steric barrier are suitable for long-term storage stability of the resin particle under the coexistence of the multivalent metal salt.

The present inventors have also found that, of the charge repulsion types, anionic resin particles agglomerate when it is mixed with a multivalent metal salt. In particular, in the case of multivalent metal salts producing tri-valent cationic ions when dissociated, the particles agglomerate instantly. As the number of valence of a cation increases, agglomeration is promoted in a large amount, thereby salting out the dispersion more.

On the other hand, cationic resin particles are sufficiently stable when left at, for example, ambient temperature. However, if the cationic resin particles are left still under heating as an acceleration test for long-term stability, it also thickens.

If the nonionic resin particle includes at least one of a polyolefin resin, a polyvinyl acetate resin, a polyvinyl chloride, a urethane resin, a styrene butadiene resin, and copolymers thereof, lamination property is particularly excellent due to strong substrate attachability.

If the multivalent metal salt includes at least one of a calcium salt, a magnesium salt, a nickel salt, and an aluminum salt, this is suitable in terms of particularly excellent storage stability and "crushed negative characters" can be suppressed due to particularly excellent ink droplet agglomeration. "crushed negative characters" is a phenomenon in which characters are rendered illegible due to wide spreading of ink droplets to areas of outline characters (also referred to as negative characters).

If the multivalent metal salt includes an aluminum salt, crushed negative characters can be suppressed due to particularly excellent ink droplet agglomeration. In addition, aluminum ions are stable as ion. Also, unlike iron (III) ion, the number of valence does not change due to acidity.

When the content ratio of the nonionic resin particle to the entire liquid composition is 0.5-20 percent by mass, the amount of resin can be sufficient. In addition, since internal stress caused by increasing the film thickness is suppressed, lamination strength of non-printed portions is excellent.

When the concentration of the multivalent metal salt to the entire liquid composition is 0.05-0.5 mol/kg, in addition to storage stability, occurrence of crushed negative characters can be suppressed.

When the glass transition temperature of the nonionic resin particle is −25 to 25 degrees C., since the nonionic resin particle is suitably soft, which is good in terms of striking a balance between the lamination strength and abrasion resistance.

In the case of an ink set including the surface treatment liquid composition and an ink including a coloring material, it is suitable to obtain printed matter having excellent abrasion resistance and image density.

The ink in the ink set preferably includes a resin particle and a non-white ink. The coloring material of the non-white ink has a volume average particle diameter of 30 to 110 nm. The resin particle is thermoplastic. Such an ink set demonstrates particularly excellent coloring and is suitable to obtain high density.

The ink in the ink set preferably includes a resin particle and a white ink. The coloring material of the white ink is white. The resin particle is thermoplastic. Such an ink set demonstrates particularly excellent coloring and is suitable to obtain high density.

The ink in the ink set preferably includes a resin particle, a white ink, and a non-white ink. The coloring material of the white ink is white and the resin particle of the white ink is thermoplastic. The coloring material of the non-white ink has a volume average particle diameter of 30 to 110 nm and the resin particle of the no-white ink is thermoplastic. Such an ink set demonstrates particularly excellent coloring and is suitable to obtain high density. In addition, the color range is wide.

Also, when the resin particle in the ink set includes at least one of an acrylic resin, a urethane resin, and a polyester resin, excellent abrasion resistance is obtained.

The ink in the ink set preferably includes a resin particle. The ratio (R/P) of the mass ratio (R) of the resin particle to the mass ratio (P) of the coloring material is 0.5-3.0. In such an ink set, furthermore excellent abrasion is obtained.

In the ink set, the glass transition temperature Tg1 of the nonionic resin particle in the surface treatment liquid composition is preferably lower than the glass transition temperature Tg2 of the resin particle in the ink. In such an ink set, the lamination strength of printed sites is excellent.

It is possible for the white ink to have a ratio (R/P) of the mass ratio (R) of the thermoplastic resin particle to the white ink to the mass ratio (P) of the coloring material to the white ink is 0.5-3.0.

It is possible for the non-white ink to have a ratio (R/P) of the mass ratio (R) of the thermoplastic resin particle to the non-white ink to the mass ratio (P) of the coloring material to the non-white ink is 0.5-3.0.

It is also possible for both of the white ink and the non-white ink to have a ratio (R/P) of a mass ratio (R) of the thermoplastic resin particle to the white ink and the non-white ink to the mass ratio (P) of the coloring material to the white ink and the non-white in is 0.5-3.0.

It is preferable that the recording method include reforming the surface of the substrate (also referred to as recording medium, print medium), applying the surface treatment liquid composition to the substrate and discharging the ink to the substrate to improve the strength of lamination on the non-printed site and the printed site. Moreover, it is preferable to conduct the reforming step with corona discharging treatment or streamer discharging treatment.

It is preferable that the recording method include reforming the surface of the substrate (also referred to as recording medium, print medium), applying the surface treatment liquid composition to the substrate and discharging the ink to the substrate to improve the strength of lamination on the non-printed site and the printed site. Moreover, it is preferable to conduct the reforming step with corona discharging treatment or streamer discharging treatment.

The recording method further includes heating after printing. This is preferable because film-forming of the thermoplastic resin in the ink is promoted, leading to amelioration of abrasion resistance of the film.

In the step of applying a surface treatment liquid composition, if the attached amount of the surface treatment liquid composition is in the range of from 0.4-2 $g/m^2$, suppressing crushed negative characters and improving strength of lamination strike a balance.

In the step of applying the ink, when the attached amount of the ink is 4-14 $g/m^2$, the image density and speed drying can strike a balance.

When the ink discharging step of the recording method includes discharging the non-white ink to a substrate and discharging the white ink to the substrate, images of a wide color gamut and high density can be obtained.

The nonionic resin particle and the multivalent metal salt serving as the constitution components of the surface treatment liquid composition of the present disclosure are described below.

Nonionic Resin Particle

The nonionic resin particle in the present disclosure can be dispersed without utilizing electric charges.

In the nonionic resin particle in the present disclosure, no monomers including acidic functional groups such as carboxyl group and sulfo group or basic functional groups such as amino group are detected by thermal composition gas chromatography (GC-MS) (e.g., GC-17A, manufactured by Shimadzu Corporation) after isolating the solid portion from the liquid composition by centrifugal.

There is no limit to the chemical structure of the resin particle. Any nonionic dispersible resin particles can be used. It is preferable that the resin particle include at least one of a polyolefin resin, a polyvinyl acetate resin, a polyvinyl chloride resin, a urethane resin, a styrene butadiene resin, and copolymers of these resins because attachment property to various substrates can be excellent. In addition, it is more preferable to include a copolymer resin of ethylene-vinyl acetate, a copolymer resin of ethylene-vinyllactate-vinyl chloride, and an olefin-modified urethane resin.

The glass transition temperature Tg of the nonionic resin particle is preferably −30 to 30 degrees C. and more preferably −25 to 25 degrees C.

When Tg is −30 degrees C. or higher, the resin film is sufficiently strong. Therefore, previously formed layers are stronger. When Tg is 30 degrees C. or lower, film-forming property of the resin is improved and flexibility (softness) is secured. As a result, substrate attachabitiliy is stronger.

The proportion of the addition amount of the solid portion is preferably 0.5 to 20 percent by mass to the total amount of the liquid composition.

When the proportion is 0.5 percent by mass or more, the substrate can be fully covered so that attachability is improved. When the addition ratio is 20 percent by mass or less, the layer thickness is not excessively thick, so that the attachment property does not deteriorate.

Multivalent Metal Salt

The multivalent metal salt quickly aggregates the coloring material after a droplet of the ink lands on a substrate so that occurrence of crushed negative characters is suppressed and coloring property is improved.

Specific examples of the multivalent metal salts include, but are not limited to, salts (multivalent metal salts) of titanium, chrome, copper, cobalt, strontium, barium, iron, aluminum, calcium, magnesium, and nickel.

Of these multivalent metal salts, in order to efficiently aggregate pigments, one or more of calcium salts, magnesium salts, nickel salts, and aluminum salts are preferable. Salts of alkali earth metal such as calcium and magnesium which produces divalent cationic ions by dissociation are more preferable.

In addition, salts of metal such as aluminum and iron which produces trivalent cationic ions by dissociation are preferable and aluminum salts are more preferable.

In particular, when the multivalent metal salts are calcium salts or aluminum salts, stability of the reaction liquid is better.

Specific examples of the multivalent metal salts include, but are not limited to, calcium carbonate, calcium nitride, calcium chloride, calcium acetate, calcium sulfate, magnesium chloride, magnesium acetate, magnesium sulfate, nickel chloride, barium sulfate, zinc sulfide, zinc carbonate, aluminum silicate, calcium silicate, magnesium silicate, aluminum hydroxide, aluminum sulfate, aluminum phosphate, aluminum lactate, polyaluminum chloride, iron (III) sulfate, potassium aluminum sulfate, potassium iron alum, and ammonium iron alum.

Of these, calcium acetate and aluminum sulfate are preferable to prevent degradation of strength of previous layers caused by deliquescence.

When the concentration of the multivalent metal salt to the entire liquid composition is 0.05-0.5 mol/kg, not only excellent storage stability is obtained but also occurrence of crushed negative characters can be suppressed.

The medium of the surface treatment liquid composition of the present disclosure is an aqueous medium. It is possible to add other articles other than water. Examples are water-soluble organic solvents, surfactants, and other minute quantity of additives.

Organic Solvent

There is no specific limitation on the type of the organic solvent used in the present disclosure. For example, water-soluble organic solvents are suitable. Specific examples include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkyl ethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

In terms that the water-soluble organic solvent serves as a humectant and also imparts a good drying property, organic solvents having a boiling point of 250 degrees C. or lower are preferable.

The proportion of the organic solvent in the surface treatment liquid composition has no particular limit and can be suitably selected to suit to a particular application.

In terms of the drying property and discharging reliability of the liquid composition, the proportion is preferably from 5 to 60 percent by mass, more preferably from 10 to 30 percent by mass, and furthermore preferably from 10 to 25 percent by mass.

In addition, when the surface treatment liquid component includes at least one of 1,2-propane diol, 1,2-butane diol, and 2,3-butane diol, it is preferable because the film-forming property of the resin is improved and abrasion resistance is also improved.

Surfactant

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

Examples of the minute quantity of additives are defoaming agents, preservatives and fungicides, and corrosion inhibitors.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

Preservatives and Fungicides

The preservatives and fungicides are not particularly limited. A specific example is 1,2-benzisothiazoline-3-on.

Corrosion Inhibitor

The corrosion inhibitor has not particular limit. Examples thereof are acid sulfite and sodium thiosulfate.

Ink

The ink of the present disclosure will be described below.

The ink includes a coloring material. In the present disclosure, the ink preferably includes resin particles.

Resin Particle

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

In addition, these resin particles are preferably thermoplastic.

Specific examples include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

The resin particle can be synthesized or is available on the market.

Specific examples of the resin particles available on the market include, but are not limited to, Microgel E-1002 and E-5002 (styrene-acrylic-based resin particles, manufactured by Nippon Paint co., Ltd.), Voncoat 4001 (acrylic-based resin particles, manufactured by Dainippon Ink and Chemicals, Inc.), Voncoat 5454 (styrene/acrylic-based resin particles, manufactured by Dainippon Ink and Chemicals, Inc.), SAE-1014 (styrene-acrylic-based resin particles, manufactured by Nippon Zeon Co., Ltd.), and Saivinol SK-200 (acrylic-based resin particles, manufactured by Saiden Chemical Industry Co., Ltd.), Primal AC-22 and AC-61 (acrylic-based resin particles, manufactured by Rohm and Haas Electronic Materials K.K.), NANOCRYL SBCX-2821 and 3689 (acrylic-silicone-based resin particles, manufactured by Toyo Ink Co., Ltd.), and #3070 (methyl methacrylate polymer resin particles, manufactured by MIKUNI COLOR LTD.).

Of these, acrylic resins, urethane resins, and polyester resins are preferable in terms of attachability with a primer and excellent abrasion resistance.

The glass transition temperature $Tg2$ of the resin particle is preferably higher than room temperature and more preferably from about 30 to about 90 degrees.

To make the strength of lamination of printed site, the glass transition temperature $Tg2$ of the resin particle is preferably higher than the glass transition temperature $Tg1$ of the nonionic resin particle contained in the surface treatment liquid composition. In addition, the glass transition temperature $Tg2$ of the resin particle is more preferably 20 degrees C. or more higher than the glass transition temperature $Tg1$ of the nonionic resin particle contained in the surface treatment liquid composition.

Coloring Material

The color of the ink contained in the surface treatment liquid composition of the present disclosure is not particularly limited. Examples are white and non-white ink.

ISO-2469 (JIS-8148) is used as the reference of the degree of white of the white ink. In general, an article having a degree of white of equal to or greater than 70 is used as white coloring material.

As the coloring material for white ink, metal oxides are preferable. Examples are titanium oxide, iron oxide, tin oxide, zirconium oxide, and iron-titanium double oxide.

In addition, a white particle having a hollow structure is also preferable.

Examples are hollow resin particle and hollow inorganic particles. Examples of the resin composition of the hollow resin particle are acrylic resins, styrene-acrylic resins, cross-linking type styrene-acrylic resins, urethane resins, and maleic-acid based resins. As the material of the hollow inorganic resin, for example, oxides, nitrides, and oxynitrides of metal such as silicon, aluminum, titanium, strontium, and zirconium showing color of white and inorganic compounds such as glass and silica.

Metal oxides are used as the coloring material for use in white ink to improve the degree of white. White particles having hollow structures are used to prevent sedimentation.

Examples of the non-white ink are color ink, black ink, gray ink, clear ink, metallic ink.

Specific examples of the color ink include, but are not limited to, cyan ink, magenta ink, yellow ink, light cyan ink, light magenta ink, red ink, green ink, blue ink, orange ink, and violet ink.

The coloring material for use in the non-white ink has no particular limit as long as it shows non-white color and can be suitably selected to suit to a particular application. For example, dyes and pigments are suitable. These can be used alone or in combination. Of these, pigments are preferable.

Examples of the pigment are organic pigments and inorganic pigments.

As the inorganic pigments, for example, in addition to calcium carbonate, barium sulfate, aluminum hydroxide, barium yellow, cadmium red, and chrome yellow, carbon black manufactured by known methods such as contact methods, furnace methods, and thermal methods can be used. These can be used alone or in combination.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelate (basic dye type chelate, acid dye type chelate), nitro pigments, nitroso pigments, and aniline black can be used. These can be used alone or in combination.

Also, hollow resin particles and inorganic hollow particles can be used.

Of these pigments, pigments having good affinity with solvents are preferable.

Specific examples of the black pigments for black include, but are not limited to, carbon black (C.I. Pigment Black 7) such as furnace black, lamp black, acetylene black, and channel black, metals such as copper, iron (C.I. Pigment Black 11), and organic pigments such as aniline black (C.I. Pigment Black 1). These can be used alone or in combination.

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. These can be used alone or in combination.

Examples of the coloring material for use in metallic ink are fine powder obtained by finely-pulverizing metal, alloyed metal, or metal compounds. Specific examples include, but are not limited to, articles made of one or more kinds of metals selected from the group consisting of aluminum, silver, gold, nickel, chrome, tin, zinc, indium, titanium, silicon, copper, or platinum, alloys obtained by combining the metals in the group, or articles obtained by finely pulverizing one or more of oxides, nitrides, sulfides, and carbides of the group of the metals or alloys.

The proportion of the coloring material in ink is preferably from 0.1 to 15 percent by mass and more preferably from 1 to 10 percent by mass in terms of enhancement of image density, fixability, and discharging stability.

In one embodiment, pigments can be dispersed in ink by, for example, a method of introducing a hydrophilic functional group into the pigment to obtain a self-dispersible pigment, a method of coating the surface of a pigment with a resin, or a method of using a dispersant to disperse a pigment.

The method of introducing a hydrophilic functional group into the pigment to obtain a self-dispersible pigment includes, for example, adding a functional group such as a sulfone group or a carboxyl group into a pigment (e.g., carbon) to render the pigment dispersible in water.

The method of coating the surface of a pigment with a resin includes encapsulating a pigment in a microcapsule to render the pigment dispersible in water. This can be referred to as a resin-coated pigment. In this case, the pigment is not necessarily coated with the resin. Pigments partially or wholly uncovered with a resin may be dispersed in the ink unless the pigments have an adverse impact.

In the method of using a dispersant to disperse a pigment, known dispersants, typically surfactants, of a small molecular weight type or a high molecular weight type is used to disperse the pigments in ink.

As the surfactant, it is possible to use, for example, anionic surfactants, cationic surfactants, nonionic surfactants, amphoteric surfactants, etc depending on the pigments. Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

Pigment Dispersion

The ink can be obtained by mixing a coloring material with water, organic solvents, etc. It is also possible to mix a pigment with water, a dispersant, etc., first to prepare a pigment dispersion and thereafter mix the pigment dispersion with materials such as water and organic solvents to manufacture ink.

The pigment dispersion is obtained by dispersing water, a pigment, a pigment dispersant, and other optional components and adjusting the particle size. It is good to use a dispersing device for dispersion.

The particle diameter of the pigment in a pigment dispersion has no particular limit. For example, it is preferable that non-white pigment have a volume average particle diameter of from 30 to 110 nm to improve dispersion stability of a pigment, discharging stability, and image quality such as image density. In addition, regarding the white pigment, the volume average particle diameter of the pigment oxide is preferably from 150 to 400 nm and more preferably from 200 to 300 nm to obtain high degree of white. With regard to the hollow resin particle, the volume average particle diameter is preferably from 200 to 1000 nm. With regard to the hollow inorganic particle, the volume average particle diameter is preferably from 10 to 200 nm to obtain excellent dispersion stability and high degree of white. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit to a particular application. In terms of improving discharging stability and image density, the proportion is preferably from 0.1 to 50 percent by mass and more preferably from 0.1 to 30 percent by mass.

During the production, coarse particles are optionally subject to filtration with a filter, a centrifuge, etc. and degassing.

Optionally, a water-soluble organic solvent, a surfactant, minute amount of additives, etc. can be added to the ink in the present disclosure as in the case of the surface treatment liquid composition. Specific examples are the same as mentioned above.

The ink in the present disclosure is manufactured by dispersing or dissolving the ink composition mentioned above in an aqueous medium followed by optional mixing and stirring.

A stirrer using a typical stirring blade, a magnetic stirrer, a high performance disperser etc., can be used for the mixing and stirring.

The property of the ink is not particularly limited and can be suitably selected to suit to a particular application. For example, viscosity, surface tension, pH, etc, are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

Ink Set

The ink set of the present disclosure includes the surface treatment liquid composition and the ink.

As the ink of the ink set, it is possible to use non-white ink and/or white ink.

Substrate (Recording Medium)

The substrate for use in printing is not particularly limited. Plain paper, gloss paper, special paper, cloth, etc. are usable. Also, in particular, good images can be formed on a non-permeating substrate.

The non-porous substrate in the present disclosure has a surface with a low level of moisture permeability, absorbency, and/or adsorptive property and includes a material having a number of hollow spaces inside but not open to the exterior.

To be more quantitative, the substrate has a water-absorption amount of 10 mL/m² or less between the contact and 30 msec$^{1/2}$ after the contact according to Bristow method.

Of the non-permeating substrate, resin film is preferable. In particular, polypropylene film, polyethylene terephthalate film, and nylon film are preferable to obtain good attachability.

Specific examples of polypropylene film include, but are not limited to, P-2002, P-2102, P-2161, and P-4166 (all manufactured by TOYOBO CO., LTD.), PA-20, PA-30, and PA-20W (all manufactured by SUN•TOX Co., Ltd.), and FOA, FOS, and FOR (all manufactured by FUTAMURA CHEMICAL CO., LTD.).

Specific examples of polyethylene terephthalate film include, but are not limited to, E-5100 and E5102 (both manufactured by TOYOBO CO., LTD.), P60 and P375 (both manufactured by TORAY INDUSTRIES, INC.), and G2, G2P2, K, and SL (all manufactured by TEIJIN FILM SOLUTIONS LIMITED).

Specific examples of nylon film include, but are not limited to, HARDEN® film N-1100, N-1102, and N-1200 (all manufactured by TOYOBO CO., LTD.) and ON, NX, MS, and NK (UNITIKA LTD.).

If a heating process is added after printing, residual solvent in an ink film decreases, which is preferable in terms of improvement of substrate attachability.

Recording Method and Recording Device

The recording method of the present disclosure includes applying a surface treatment liquid composition to a substrate and printing to discharge (apply) an ink to the substrate, using the ink set including the surface treatment liquid composition and the ink.

The recording method of the present disclosure preferably further includes reforming the surface of the substrate.

Surface Reforming

The surface reforming step can be executed by any method being free of uneven application of the liquid component and capable of improving attachability. Examples of such methods are corona treatment, atmospheric pressure plasma processing, frame processing, and ultraviolet irradiation processing.

These known processing can be executed by a known device.

Of these processing methods, regarding the surface reforming of the recording surface, corona processing to conduct corona discharging on a recording surface or streamer processing (plasma processing) to conduct streamer discharging are preferable. In comparison with atmospheric pressure plasma processing, frame processing, and ultraviolet irradiation processing, corona processing is preferably used because the output performance stability of corona discharging is stable and surface treatment can be uniformly conducted on a recording surface.

Ink Discharging

It is preferable to execute the printing step by inkjet method.

The ink is discharged by an ink discharging head including a nozzle to discharge the ink, a plurality of individual liquid chambers communicating with the nozzle, a flow-in path to flow the ink into the individual liquid chambers, a flow-out path to flow the ink out of the individual liquid chambers. Also, the step of printing preferably further includes circulating the ink from the flow-out path to the flow-in path.

Ink including a resin component tends to cause defective discharging due to changing over time. However, by this circulating process, quality images can be obtained with good productivity without causing image defects such as discharging disturbance, etc.

It is possible and preferable to provide a heating process after the ink discharging.

As for the ink, when using both non-white ink and white ink, the ink is applied in the sequence of the non-white ink and the white ink or the other way around. In addition, it is preferable to provide the heating process after both or either of the non-white ink discharging process and the white ink discharging process.

Heating is conducted at a temperature range of preferably from 30 to 100 degrees C. and more preferably from 60 to 80 degrees C. to sufficiently dry a substrate and prevent damaging to the substrate. The heating time is preferably from 10 seconds to 10 minutes and more preferably from 1 minute to 2 minutes to sufficiently dry a substrate and prevent damaging to the substrate.

In addition, in the ink discharging of discharging the non-white ink to a substrate and the ink discharging of discharging the white ink to a(the) substrate, the respective attachment amounts of the non-white ink and the white ink are from 4 to 14 $g/m^2$.

It is possible to discharge the white ink to the entire surface of a substrate to form the background and undercoating thereof or to a part of the substrate to form the undercoating thereof. In addition, when discharging white ink to a part of a substrate, for example, it is suitable to discharge the white ink to the same site or partially overlapping site of the print site of the non-white ink. When non-white ink is laminated on the layer of white ink on a transparent substrate, visibility of the thus-obtained image is better than when the non-white ink is directly applied onto the transparent substrate. When white ink is applied to a site where no image is formed, images having a background can be formed.

Undercoating means an undercoating viewed from the image surface onto which the non-white ink is discharged. When non-white ink and white ink are discharged to a substrate in this sequence, the white ink forms undercoating if viewed from the image surface onto which the non-white ink is discharged.

The recording device includes the ink set of the present disclosure and a discharging head to discharge the ink of the ink set.

The ink discharging head preferably includes a nozzle to discharge the ink, a plurality of individual liquid chambers communicating with the nozzle, a flow-in path to flow the ink into the individual liquid chambers, a flow-out path to flow the ink out of the individual liquid chambers and a circulating device to circulate the ink from the flow-out path to the flow-in path.

The ink for use in the present disclosure can be suitably used for various printing devices employing an inkjet printing method such as printers, facsimile machines, photocopiers, multifunction peripherals (serving as a printer, a facsimile machine, and a photocopier), and 3D object manufacturing devices (3D printers, additive manufacturing device).

In the present disclosure, the recording device and the recording method respectively represent a device capable of attaching (applying) an ink and the surface treatment liquid composition of the present disclosure to a recording (print) medium and a method of printing an image on the print medium using the device. The print (recording) medium means an article to which the ink or the various processing fluids can be attached at least temporarily.

The recording device may further optionally include a device relating to sheet (print medium) feeding, conveying, and ejecting the print medium and other devices referred to as a pre-processing device, a post-processing device, etc. in addition to the device to attach the surface treatment liquid composition and the head portion to discharge the ink.

The recording device and the recording method may further optionally include a heater for use in the heating process and a drier for use in the drying process. The heating device and the drying device include, for example, devices to heat and dry the print surface and the reverse surface of a print medium. The heating device and the drying device are not particularly limited. For example, a fan heater and an infra-red heater can be used. The print medium can be heated and dried before, during, and after printing.

In addition, the recording device and the recording method are not limited to those producing merely meaningful visible images such as texts and figures with the ink. For example, the recording device and the recording method can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a large print medium such as A0, a continuous printer capable of using continuous paper reeled up in a roll form as recording media.

Figure 2:
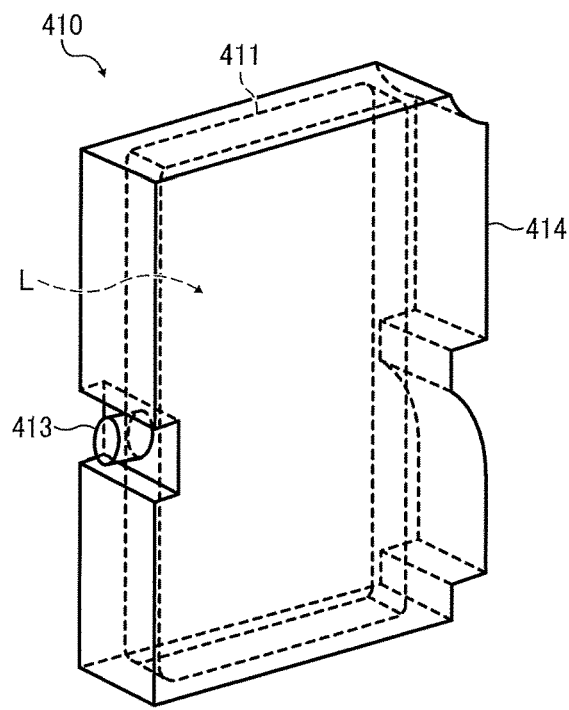
FIG. 2 is a diagram illustrating a perspective view of the main tank accommodating the ink according to an embodiment of the present disclosure.

The recording device of the present disclosure is described using an example with reference to FIG. 1 and FIG. 2.

FIG. 1 is a diagram illustrating a perspective view of the recording device. FIG. 2 is a diagram illustrating a perspective view of the main tank. An image forming apparatus 400 as an example of the recording (printing) device is a serial type image forming apparatus. A mechanical unit 420 is disposed in a housing 401 of the image forming apparatus 400. Also, the image forming apparatus 400 includes a pre-processing device to apply the surface treatment liquid composition of the present disclosure. Each ink accommodating unit (ink container) 411 of each main tank 410 (410*k*, 410*c*, 410*m*, and 410*y*) for each color of black (K), cyan (C), magenta (M), and yellow (Y) is made of a packaging member such as aluminum laminate film. The ink container 411 is, for example, accommodated in a plastic housing unit 414. As a result, the main tank 410 is used as an ink cartridge of each color.

Although black (K), cyan (C), magenta (M), and yellow (Y) are used in this description, it is possible to use white instead of at least one of black (K), cyan (C), magenta (M), and yellow (Y) or add white ink to black (K), cyan (C), magenta (M), and yellow (Y).

A cartridge holder 404 is disposed on the rear side of the opening when a cover 401*c* is opened. The cartridge holder 404 is detachably attachable to the main tank 410. As a result, each ink discharging outlet 413 of the main tank 410 communicates with a discharging head 434 for each color via a supplying tube 436 for each color so that the ink can be discharged from the discharging head 434 to a print (recording) medium.

Figure 10:
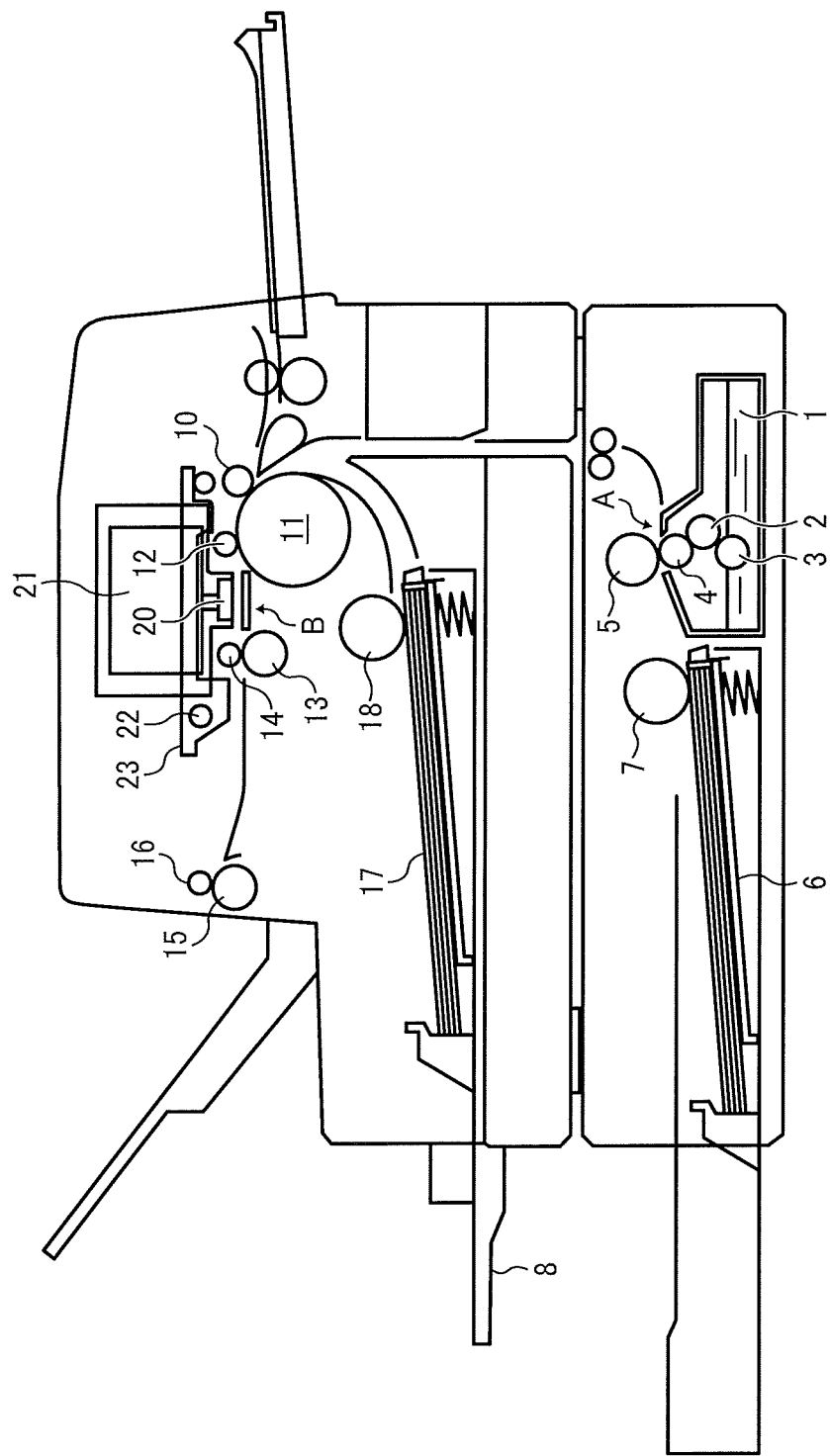
FIG. 10 is diagram illustrating a cross section of the recording device according to an embodiment of the present disclosure.

A device to form images with ink after applying the surface treatment liquid composition of the present disclosure as a pre-processing fluid to a substrate is described with reference to FIG. 10. FIG. 10 is a diagram illustrating an example of the inkjet recording device scanning an inkjet recording head to form images.

In the device of FIG. 10, a substrate 6 is sent out by a sheet feeding roller 7 and an application roller 4 and a counter roller 5 thinly and evenly apply a pre-processing fluid 1 to the substrate 6. The pre-processing fluid 1 is drawn up by a draw-up roller 3 and evenly applied to the application roller 4 by a layer thickness regulating roller 2. The substrate 6 to which the pre-processing fluid is applied is sent to a recording scanning unit including an inkjet recording head 20.

Figure 11:
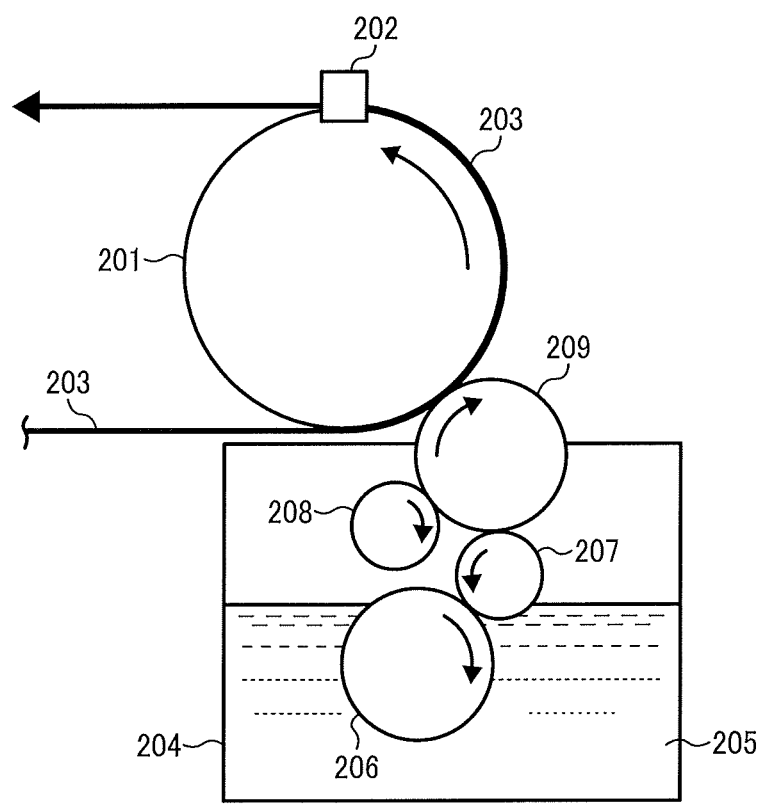
FIG. 11 is a schematic diagram illustrating an example of the device to apply the surface treatment liquid composition of the present disclosure.

FIG. 11 is another example of the pre-processing unit. The pre-processing unit illustrated in FIG. 11 accommodates a pre-processing fluid 205 in a pre-processing fluid container 204. In this unit, a thin film of the pre-processing fluid 205 is formed on the surface of an application roller 209 by a stirring and supplying roller 206, a conveying roller 207, and a thin film forming roller 208. Thereafter, the application roller 209 rotates while being pressed against a rotatable counter roller 201 and the pre-processing fluid 205 is applied to the surface of a recording medium 203 while the recording medium 203 passes between the application roller 209 and the rotatable counter roller 201. At the same time, a pressure controller 202 adjusts the nip pressure between the counter roller 201 and the application roller 209 to control the application amount of the pre-processing fluid 205. In addition, by controlling the rotation speed of the counter roller 201 and the application roller 209, the application amount of the pre-processing fluid 205 can be adjusted. The application roller 209 and the counter roller 201 are driven by a power supply such as drive motor. The rotation speed of the application roller 209 and the counter roller 201 can be controlled by adjusting the energy of the power supply.

By using the application roller 209 to apply the pre-processing fluid 205 to the recording area of the recording medium 203, the pre-processing fluid 205 having a relatively high viscosity can be thinly applied to the recording medium 203 to subdue occurrence of uneven coloring more.

The application method of the pre-processing fluid in the pre-processing unit 302 is not limited to the roll coating method. Other specific methods are, for example, a blade coating method, a gravure coating method, a gravure offset coating method, a bar code method, and a roll coating method.

The pre-processing fluid 205 can be applied to the entire recording area of the recording medium 203 or only the area to which an image is formed.

On the thus-dried recording medium 203, an image is formed by the inkjet recording unit 304 in response to image data.

Figure 3:
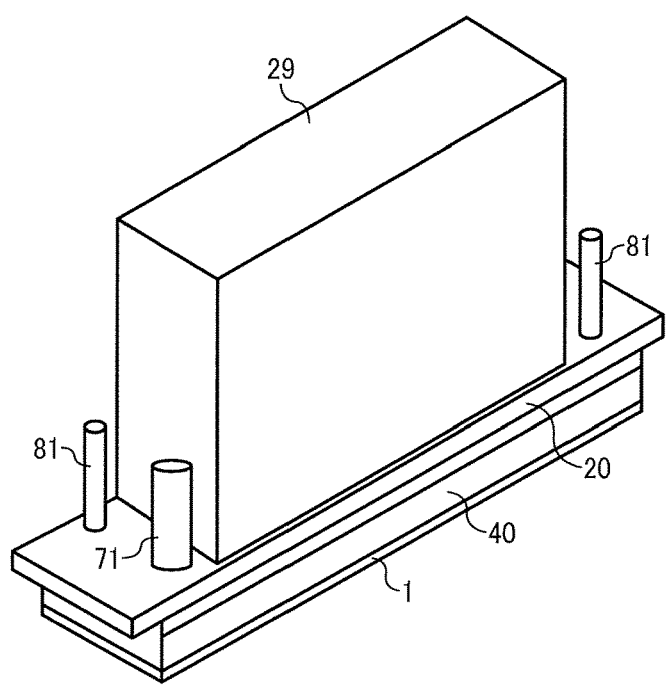
FIG. 3 is a diagram illustrating a perspective view of the appearance of the liquid discharging head according to an embodiment of the present disclosure.
Figure 4:
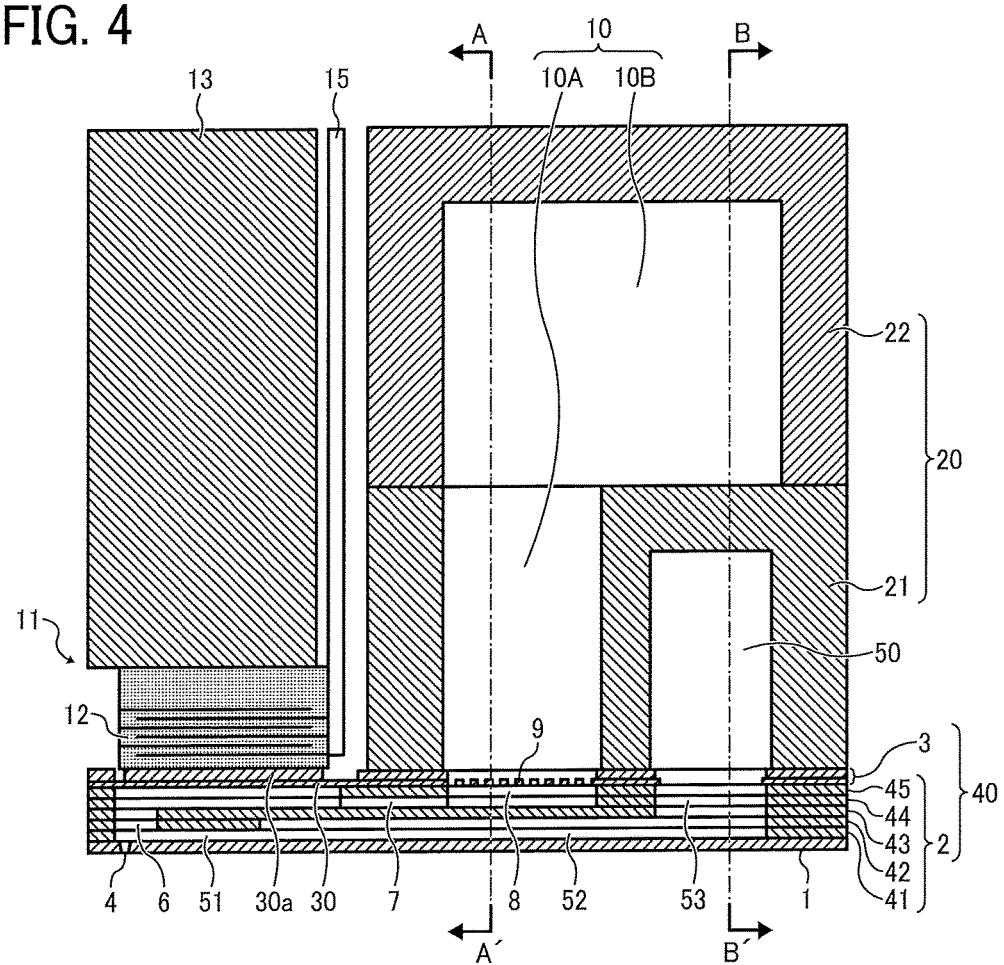
FIG. 4 is diagram illustrating a cross section of the liquid discharging head illustrated in FIG. 3 along the direction vertical to the nozzle arrangement direction.
Figure 5:
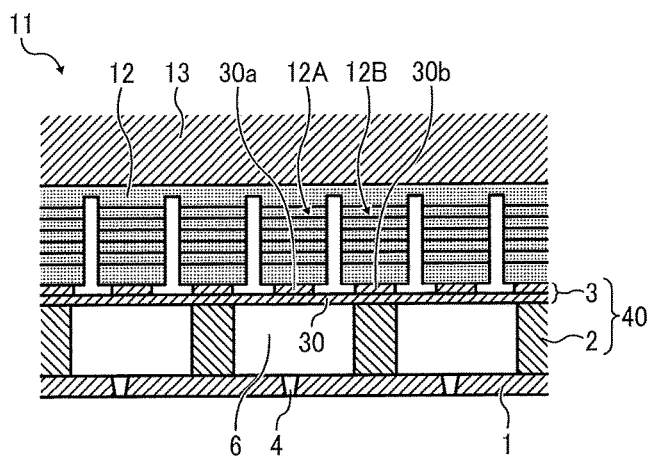
FIG. 5 is a diagram illustrating a cross section of a part of the liquid discharging head illustrated in FIG. 3 along the direction parallel to the nozzle arrangement direction.
Figure 6:
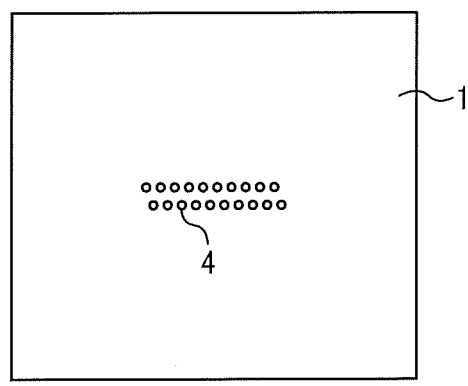
FIG. 6 is a diagram illustrating a planar view of the nozzle plate of the liquid discharging head illustrated in FIG. 3.

Next, an example of the liquid discharging head relating to the present disclosure is described with reference to FIG. 3 to FIG. 8. FIG. 3 is a diagram illustrating an outlook perspective view of the liquid discharging head, FIG. 4 is a diagram illustrating a cross section of the liquid discharging head in the direction vertical to the arrangement direction of nozzles of the liquid discharging head, FIG. 5 is a diagram illustrating a cross section of the liquid discharging head in the direction parallel to the nozzle arrangement direction of the discharging head, FIG. 6 is a diagram illustrating a planar view of the nozzle plate of the discharging head, FIGS. 7A to 7F are diagrams illustrating planar views of each member constituting flow path members of the liquid discharging head, and FIGS. 8A and 8B are diagrams illustrating a planar view of each member constituting a common liquid chamber member.

In the liquid discharging head, a nozzle plate 1, a flow path plate 2, and a diaphragm 3 as a wall member are attached to and laminated on each other. Also, it includes a piezoelectric actuator 11 to displace a diaphragm 3 and a common liquid chamber member 20, and a cover 29.

The nozzle plate 1 includes multiple nozzles 4 to discharge liquid.

The flow path plate 2 includes an individual liquid chamber 6 communicating with the nozzle 4, a fluid resistance unit 7 communicating with the individual liquid chamber 6, and a liquid introduction unit 8 communicating with the liquid resistance unit 7. In addition, the flow path plate 2 is formed by multiple plate-like members 41 to 45 in a lamination manner from the nozzle 1 side. The plate-like members 41 to 45 and the diaphragm 3 are layered to form a flow path member 40.

The diaphragm 3 includes a filter portion 9 serving as an opening communicating with the common liquid chamber 10 formed of a liquid introducing unit 8 and the common liquid chamber member 20.

The flow-in path communicates with the individual liquid chamber 6 and is deposited somewhere before the liquid is introduced into the individual liquid chamber 6. The flow-in path corresponds to the liquid introducing unit 8 and the common liquid chamber 10.

The diaphragm 3 is a wall member constituting the wall of the individual liquid chamber 6 of the flow path plate 2. This diaphragm 3 employs a two-layered structure (but not limited thereto) including the first layer forming a thin portion and the second layer forming a thick portion from the flow path plate 2 side. A deformable vibration area 30 is formed at the portion of the first layer corresponding to the individual liquid chamber 6.

The nozzle plate 1 includes a plurality of the nozzles 4 in zigzag manner as illustrated in FIG. 6.

Figure 7A:
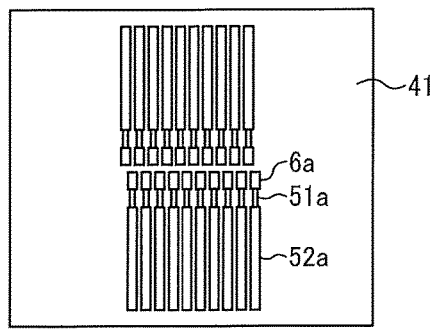
FIGS. 7A to 7F are diagrams illustrating planar views of each member constituting the flow path member of the liquid discharging head illustrated in FIG. 3.
Figure 8A:
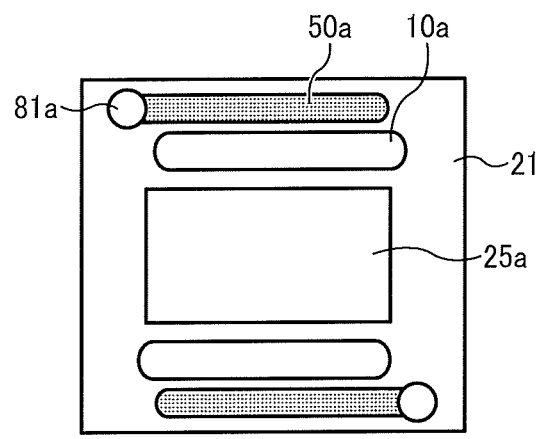
FIGS. 8A and 8B are diagrams illustrating the planar view of each member constituting the common liquid chambers of the liquid discharging head illustrated in FIG. 3.
Figure 8B:
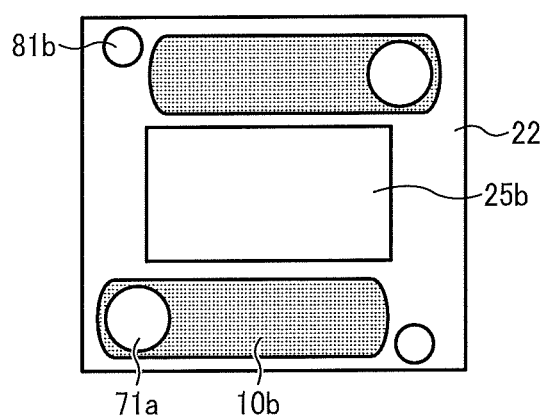

As illustrated in FIG. 7A, the plate-like member 41 constituting the flow path plate 2 includes a through groove portion (meaning through hole having a groove form) 6a constituting the individual liquid chamber 6, a through groove hole 51a constituting the fluid resistance portion 51 and a through groove hole 52a constituting a circulating flow path 52.

Figure 7B:
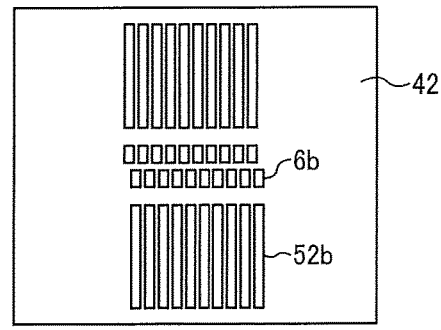

As illustrated in FIG. 7B, the plate-like member 42 includes a through groove portion 6b constituting the individual liquid chamber 6 and a through groove hole 52b constituting the circulating flow path 52.

Figure 7C:
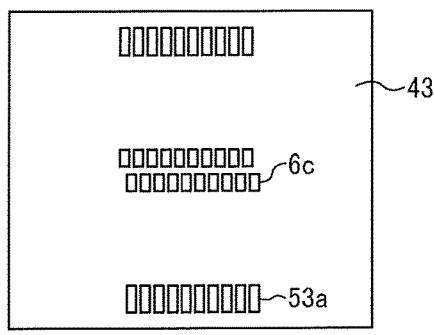

As illustrated in FIG. 7C, the plate-like member 43 includes a through groove portion 6c constituting the individual liquid chamber 6 and a through groove hole 53a constituting the circulating flow path 53. The through groove hole 53a has a longitudinal direction along the nozzle disposition direction.

Figure 7D:
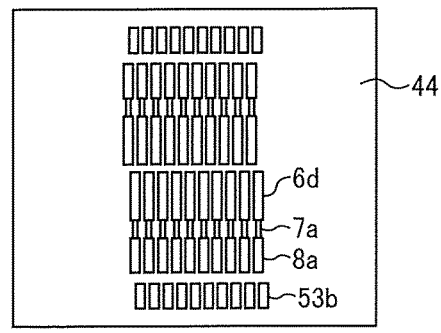

As illustrated in FIG. 7D, the plate-like member 44 includes a through groove portion 6d constituting the individual liquid chamber 6, a through groove hole 7a constituting the fluid resistance portion 7, a through groove hole 8a constituting the liquid introducing unit 8, and a through groove hole 53b constituting the circulating flow path 53. The through groove hole 53b has a longitudinal direction along the nozzle disposition direction.

Figure 7E:
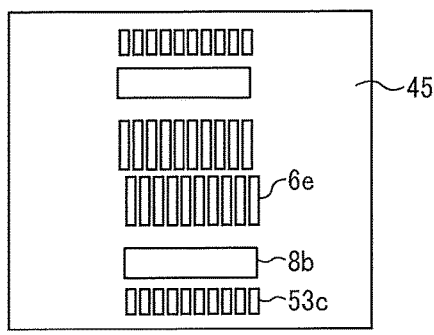

As illustrated in FIG. 7E, the plate-like member 45 includes a through groove portion 6e constituting the individual liquid chamber 6, a through groove hole 8b (serving as liquid chamber situated downstream of the filter) constituting the liquid introducing unit 8, and a through groove hole 53 constituting the circulating flow path 53. The through groove hole 8b has a longitudinal direction along the nozzle disposition direction. Also, the through groove hole 53c has a longitudinal direction along the nozzle disposition direction.

Figure 7F:
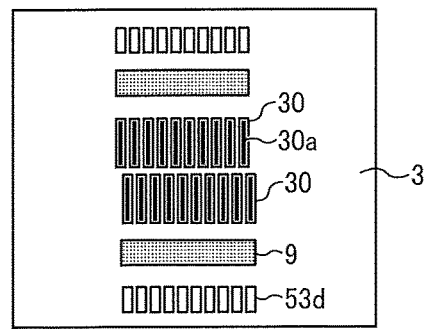

As illustrated in FIG. 7F, the diaphragm 3 includes the vibration area 30, the filter portion 9, and a through groove portion 53d constituting the circulating flow path 53. The through groove hole 53d has a longitudinal direction along the nozzle disposition direction.

As a consequence, a complicate flow path can be formed by a simple configuration in which the flow path member is formed by attached multiple plate-like members in lamination manner.

According to the configuration described above, in the flow path member 40 including the flow path plate 2 and the diaphragm 3, a fluid resistance portion 51 disposed along the plane direction of the flow path plate 2 communicating with each of the individual liquid chamber 6, the circulating flow path 52, and a circulating flow path 53 disposed in the thickness direction of the flow path 40 communicating with the circulating flow path 52. The circulating flow path 53 communicates with a circulating common liquid chamber 50, which is described later.

The flow-out path communicates with the individual liquid chamber 6 and is deposited after the liquid is introduced into the individual liquid chamber 6. The flow-out path corresponds to the circulating flow paths 52 and 53 and a circulation common liquid chamber 50.

The common liquid chamber member 20 includes the common liquid chamber 10 to which liquid is supplied from a supply and circulation mechanism 494 and a circulation common liquid chamber 50.

As illustrated in FIG. 8A, a first common liquid chamber member 21 constituting the common liquid chamber member 20 includes a through hole 25a for piezoelectric actuator, a through groove hole 10a as a common liquid chamber 10A on the downstream side and a groove 50a having a base as the circulation common liquid chamber 50.

As illustrated in FIG. 8B, a second common liquid chamber member 22 includes a through hole 25b for piezoelectric actuator and a groove 10b as a common liquid chamber 10B on the upstream side.

In addition, referring to FIG. 3, the second common liquid chamber member 22 includes a through hole 71a to communicate one end of the common liquid chamber 10 in the nozzle arrangement direction with a supply port 71.

Similarly, the first common liquid chamber member 21 and the second common liquid chamber member 22 respectively include a through hole 81a and a through hole 81b to communicate the other end (the opposite end on the side of the through hole 71a) of the circulation common liquid chamber 50 with a circulation port 81.

In FIG. 8, the groove having a base is subject to coating. This is true for other FIGS.

The common liquid chamber member 20 includes the first common liquid chamber member 21 and the second liquid chamber member 22. The first common liquid chamber member 21 is attached to the flow path member 40 on the diaphragm 3 side and the second liquid chamber member 22 is attached to and laminated on the first common liquid chamber member 21.

The first liquid chamber member 21 forms the common liquid chamber 10A on the downstream side constituting a part of the common liquid chamber 10 communicating with the liquid introduction portion 8 and the circulation common liquid chamber 50 communicating with the circulation flow path 53. In addition, the second common liquid chamber 22 forms the common liquid chamber 10B on the upstream side as the rest of the common liquid chamber 10.

The common liquid chamber 10A on the downstream side constituting a part of the common liquid chamber 10 and the circulation common liquid chamber 50 are disposed in the direction vertical to the nozzle arrangement direction. The circulation common liquid chamber 50 is disposed at the position projected in the common liquid chamber 10.

By this disposition, the dimension of the circulation common liquid chamber 50 is free of the restriction ascribable to the dimensions required for the individual liquid chamber 6 formed by the flow path member 40 and the flow path including the fluid resistance unit 7 and the liquid introduction unit 8.

The circulation liquid chamber 50 and the common liquid chamber 10 are partially disposed side by side and the circulation liquid chamber 50 is located at the position projected in the common liquid chamber 10. Therefore, the width of the head in the direction vertical to the nozzle direction can be suppressed, thereby preventing size increase of the head. The common liquid chamber member 20 forms the common liquid chamber 10 and the circulation common liquid chamber 50 to which liquid is supplied from a head tank or a liquid cartridge.

On the opposite side of the individual liquid chamber 6 of the diaphragm 3, there is arranged the piezoelectric actuator 11 including an electromechanical transducer element to deform the vibration area 30 of the diaphragm 3.

As illustrated in FIG. 5, this piezoelectric actuator 11 includes the piezoelectric member 12 attached to a base material 13. The piezoelectric member 12 is grooved by half cut dicing and a particular number of piezoelectric elements (piezoelectric pillar) 12A and 12B having a pillar-like form are formed in the piezoelectric member 12 spaced a predetermined distance therebetween in a pectinate manner.

The piezoelectric element 12A of the piezoelectric member 12 is driven by application of a drive waveform while the piezoelectric element 12B is not driven by a drive waveform but simply used as a pillar. However, all of the piezoelectric elements 12A and 12B can be used as the piezoelectric element to be driven by drive waveforms.

The piezoelectric element 12A is attached to a convex portion 30a, which is a thick portion having an island-like form formed on the vibration area 30 of the diaphragm 3. The piezoelectric element 12B is attached to a convex portion 30b, which is a thick part of the diaphragm 3.

The piezoelectric element 12 includes piezoelectric layers and internal electrodes alternately laminated on each other. The internal electrode is pulled out to the end surface to form an external electrode. The external electrode is connected with a flexible wiring member 15.

In the liquid discharging head having such a configuration, for example, the piezoelectric element 12A contracts by, for example, lowering the voltage applied to the piezoelectric element 12A in comparison with a reference voltage. For this reason, the vibration area 30 of the diaphragm 3 is lowered, thereby inflating the volume of the individual liquid chamber 6. As a result, the liquid flows into the individual liquid chamber 6.

Thereafter, the piezoelectric element 12A is elongated in the lamination direction by raising the voltage applied to the piezoelectric element 12A to deform the vibration area 30 of the diaphragm 3 toward the nozzle 4, thereby applying a pressure to the liquid in the individual liquid chamber 6 to discharge the liquid from the nozzle 4.

Thereafter, the voltage applied to the piezoelectric element 12A is returned to the reference voltage. Accordingly, the vibration area 30 of the diaphragm 3 is back to the initial position so that the individual liquid chamber 6 inflates, which generates a negative pressure. At this point, the liquid is supplied from the common liquid chamber 10 to the individual liquid chamber 6. After the vibration of the meniscus surface of the nozzle 4 decays and is stabilized, the system starts operations to discharge the next droplet.

The drive method of the head is not limited to the above-mentioned (pull-push discharging). The way of discharging changes depending on how a drive waveform is applied. For example, pull discharging or push discharging is possible. In addition, in the embodiments described above, a lamination type piezoelectric element is used as a pressure generating device to cause pressure fluctuation to the individual liquid chamber 6 but the pressure generating device is not limited thereto. It is possible to use a piezoelectric element having a thin-film like form. Furthermore, it is possible to use a heat element disposed in the individual liquid chamber 6 to form bubbles by heat, thereby generating pressure fluctuation or utilize electrostatic force to cause pressure fluctuation.

Next, one example of the liquid circulation system using the liquid discharging head relating to one embodiment of the present disclosure is described with reference to FIG. 9.

Figure 9:
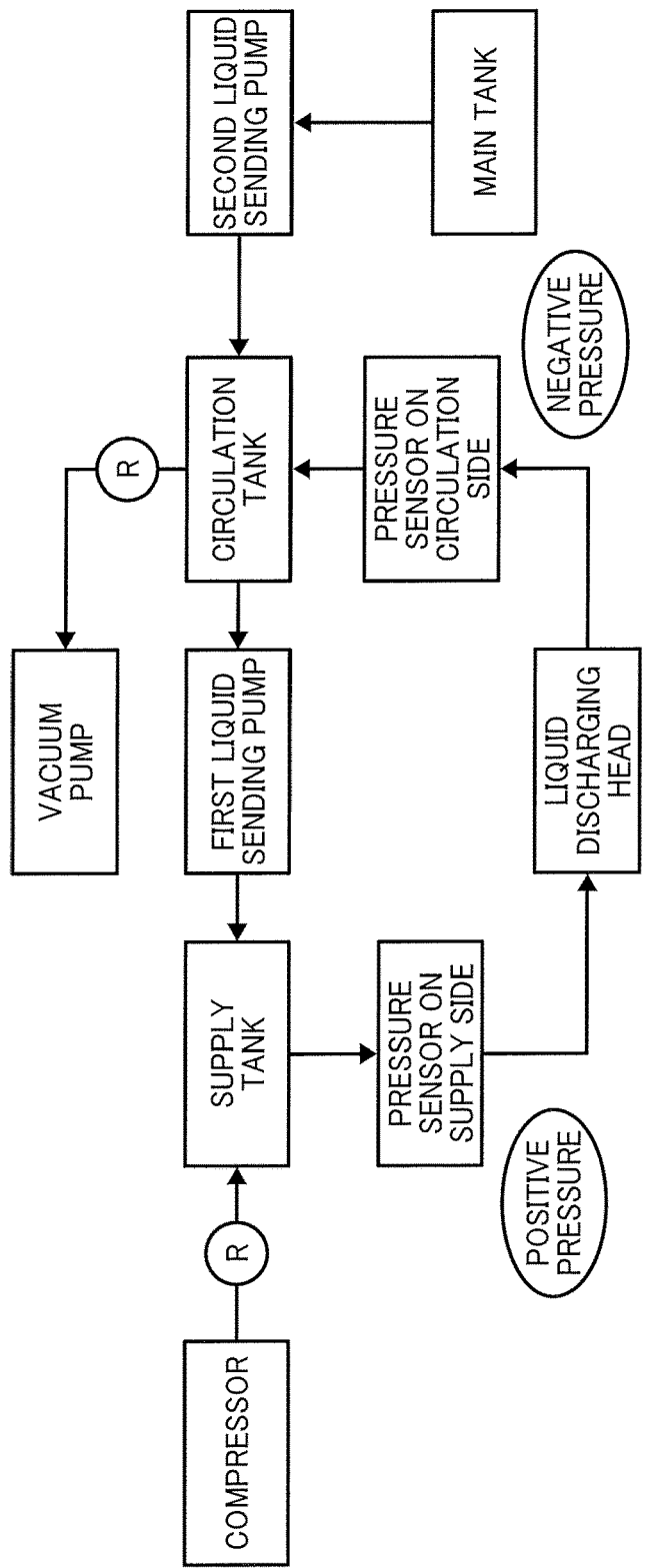
FIG. 9 is a block diagram illustrating an example of the liquid circulation system relating to an embodiment of the present disclosure.

FIG. 9 is a block diagram illustrating the liquid circulation system relating to one embodiment of the present disclosure.

As illustrated in FIG. 9, the liquid circulation system includes a main tank, a liquid discharging head, a supply tank, a circulation tank, a compressor, a vacuum pump, a first liquid sending pump, a second liquid sending pump, a regulator (R), a pressure sensor on the supply side, and a pressure sensor on the circulation side. The pressure sensor on the supply side is situated between the supply tank and the liquid discharging head and connected with the supply flow path side connected with the supply port 71 (FIG. 3) of the liquid discharging head. The pressure sensor on the circulation side is situated between the liquid discharging head and the circulation tank and connected with the circulation flow path side connected with the circulation port 81 (FIG. 3) of the liquid discharging head.

One end of the circulation tank is connected with the supply tank via the first liquid sending pump and the other end is connected with the main tank via the second liquid sending pump. The liquid is flown from the supply tank into the liquid discharging head via the supply port 71 and discharged from the circulation port to the circulation tank. Moreover, the liquid is sent from the circulation tank to the supply tank by the first liquid sending pump to circulate the liquid.

In addition, a compressor is connected with the supply tank in order to detect a predetermined positive pressure at the pressure sensor on the supply side. In addition, the vacuum pump is connected with the circulation tank in order to detect a predetermined negative pressure at the pressure sensor on the circulation side. Accordingly, while circulating the liquid through the liquid discharging head, the negative pressure of the meniscus can be kept constant.

In addition, when liquid droplets are discharged from the nozzle of the liquid discharging head, the amount of the liquid in the supply tank and the circulation tank decreases. Therefore, it is preferable to properly replenish liquid from the main tank to the circulation tank using the second liquid sending pump. The timing of the replenishment from the main tank to the circulation tank can be controlled according to the detection result of the liquid surface sensor disposed in the circulation tank. For example, liquid can be replenished when the liquid surface of the ink in the circulation tank is lowered in comparison with the predetermined height.

Next, the circulation of the liquid in the liquid discharging head is described. As illustrated in FIG. 3, the supply port 71 communicating with the common liquid chamber and the circulation port 81 communicating with the circulation common liquid chamber 50 are formed on one end of the common liquid chamber member 20. The supply port 71 and the circulation port 81 are respectively connected with the supply tank and the circulation tank (FIG. 9) to store liquid via tubes. The liquid stored in the supply tank is supplied to the individual liquid chamber 6 via the supply port 71, the common liquid chamber 10, the liquid introduction unit 8, and the fluid resistance unit 7.

Moreover, while the liquid in the individual liquid chamber 6 is discharged from the nozzle 4 due to drive of the piezoelectric member 12, a part or the entire of the liquid remaining in the individual liquid chamber 6 without being discharged is circulated from the fluid resistance unit 51, the circulation flow paths 52 and 53, the circulation common liquid chamber 50, and the circulation port 81 to the circulation tank.

The liquid can be circulated during not only the operation of the liquid discharging head but also waiting time. Circulating the liquid during waiting time is preferable because the liquid in the individual liquid chamber is constantly refreshed and agglomeration or sedimentation of the component contained in the liquid can be suppressed.

Furthermore, a restoring device can be disposed to restore the head from defective discharging. The restoring device has a capping device, a suction device, and a cleaning device. The head is moved toward this restoring device while standing by for printing and the head is capped by the capping device to keep the discharging orifice in a wet state to prevent defective discharging ascribable to ink drying. Moreover, by jetting ink having nothing to do with recording in the middle of recording, ink viscosity in all the discharging orifices is kept even to stabilize discharging performance.

When defective discharging occurs, the nozzle orifice of the head is sealed by the capping device, air bubbles, etc. is suctioned from the nozzles via a tube together with ink by the suction device, so that the ink and dirts attached to the nozzle surface is removed by the cleaning device, resulting in restoring the nozzles from defective discharging. Moreover, the ink suctioned is ejected to a waste ink storage disposed on the bottom of the printer (image forming apparatus) and absorbed and held in an ink absorbent inside the waste ink storage.

This recording device may include not only a portion discharging ink but also a pre-processing device to apply the liquid component of the present disclosure as the pre-processing fluid and a post-processing device as referred to as a post-processing device.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

Ink Cartridge

It is also possible to include a cartridge including a container to accommodate the surface treatment liquid composition of the present disclosure and other optional members.

There is no specific limit to the container. Any form, any structure, any size, and any material can be suitably selected. For example, a container including at least an accommodating portion formed of aluminum laminate film, a resin film, etc. can be suitably used.

Printed Matter

The printed matter relating to the present disclosure includes an image thereon using the recording method of the present disclosure.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Next, the present disclosure is described in detail with reference to Examples and Comparative Examples but not limited thereto.

Preparation of Emulsion of Nonionic Resin Particle

Preparation of Ethylene Vinyl Acetate Resin Emulsion A 1,061 g of PVA-1 (degree of polymerization: 1,700, degree of saponification: 88 mol percent, manufactured by KURARAY CO., LTD.), 19,440 g of deionized water, 12.7 g of L(+) sodium tartrate, 10.6 g of sodium acetate, and 0.4 g of iron chloride were charged in a pressure resistant 50 litter autoclave equipped with a nitrogen introducing opening, a thermometer, and a stirrer. The recipe was completely dissolved at 95 degrees C. and thereafter cooled down to 60 degrees C. followed by nitrogen replacement.

Next, 22,360 g of vinyl acetate was added and ethylene was pressurized to 45 kg/cm$^2$ and introduced. 1,000 g of 0.4 percent aqueous solution of hydrogen peroxide was injected in five hours to conduct emulsion polymerization at 60 degrees C.

When pH at the initial stage of the polymerization was checked, it was 5.2

When the remaining amount of vinyl acetate became 10 percent, ethylene was discharged to adjust the ethylene pressure to be 20 kg/cm$^2$ and 50 g of 3 percent aqueous solution of hydrogen peroxide was injected in to continue polymerization.

When the amount of vinyl monomer remaining in the emulsion became 1.5 percent, ethylene was discharged and cooled down.

Subsequent to cooling down, pH was checked. It was 4.8 Thereafter, 20 g of sodium sulfite was added and the resultant was subject to de-ethylenization for one hour at 30 degrees C. with a reduced pressure of 100 mmHg.

The system was returned to atmospheric pressure by nitrogen and thereafter, 10 g of t-butylhydroperoxide was added followed by stirring for two hours.

When pH at the completion of the polymerization was checked, it was 4.7

The thus-obtained emulsion was filtered and the solid portion was adjusted to be 50 percent to obtain a resin emulsion A of copolymer of ethylene-vinyl acetate.

When Tg of the resin emulsion A was measured by a differential scanning calorimetry (thermo plus EVO2/DSC, manufactured by Rigaku Corporation), it was zero degree.

Preparation of Urethane Resin Emulsion A

To 1 mol of 1,6-hexanediol, 1.4 mol of dicyclohexylmethane isocyanate, 0.1 mol of diisocyanate compound prepared by reacting 1 mol of isocyanulate trimer of 1,6-hexamethylene diisocyanate with ⅓ mol of polyethylene glycol monomethylether having a molecular weight of 1,000, N-methyl-2-pyrolidone accounting for 15 percent for the total mass were placed in a reaction flask to conduct reaction for two hours at 90 degrees C. in nitrogen atmosphere to obtain a prepolymer.

450 g of the-thus obtained prepolymer composition having a solid portion of 85 percent was dripped in 15 minutes to 600 g of water in which 0.2 g of silicone-based defoaming agent (SE-21, manufactured by Wacker Asahikasei Silicone co., ltd.). Subsequent to ten-minute stirring at 25 degrees C., the compound represented by the following Chemical formula 1, ethylene diamine, and hydrazide adipate to obtain a polyurethane resin emulsion A.

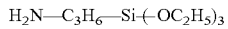

$$H_2N-C_3H_6-Si-(-OC_2H_5)_3 \qquad \text{Chemical Formula 1}$$

When Tg of the polyurethane resin emulsion A was measured by a differential scanning calorimetry (Thermo plus EVO2/DSC, manufactured by Rigaku Corporation), it was 20 degrees C.

Preparation of Polyester Resin Emulsion A

First, 3.0 parts of hydroxyethyl cellulose (METOLOSE 60SH-50, manufactured by Shin-Etsu Chemical Co., Ltd.) and 30 parts of nonionic emulsifier (EMULGEN 1108, manufactured by Kao Corporation) were preliminarily dissolved in 225 parts of water in solid portion conversion to prepare an emulsifier aqueous solution.

Thereafter, 150 parts of amorphous poly-lactic acid (VYLOECOL BE-450, manufactured by TOYOBO CO., LTD.) was dissolved in 300 parts of toluene in a reaction container equipped with a thermometer, a nitrogen introducing tube, a stirrer, and a condenser. The emulsifier aqueous solution obtained above was added to conduct preliminary emulsification by stirring and mixing at 45 degrees C. for 30 minutes.

The thus-obtained preliminary emulsified matter was emulsified under a pressure of 300 kg/m$^2$ by a high pressure emulsifying machine (Manton-Gaulin Company) to obtain a fine emulsified matter.

This fine emulsified matter was heated and evaporated with a reduced pressure under 130 mmHg to remove toluene. Thereafter, a solid portion was prepared to obtain a polyester emulsion having a solid portion of 45 percent, a pH of 2.4, and a particle diameter of 0.32 μm. Thereafter, the emulsion was prepared to have a pH of 7.0 by 25 percent ammonium water.

0.6 parts of a thickening agent (PRIMAL™ ASE-60, manufactured by Rohm and Haas Electronic Materials K.K.)

was added to the polyester emulsion to prepare the solid portion to be 40 percent to obtain a polyester resin emulsion A.

When Tg of the polyester resin emulsion A was measured by a differential scanning calorimetry (Thermo plus EVO2/DSC, manufactured by Rigaku Corporation), it was zero degrees C.

Liquid Composition Example 1

The following recipe was mixed and stirred and filtrated by a filter having an opening of 5 μm (Minisart, manufactured by Sartorius Stedim Biotech GmbH) to obtain a liquid composition of liquid composition Example 1.

| | |
|---|---|
| 1,2-propane diol: | 10 parts |
| EMULGEN LS-106 (nonionic surfactant, manufactured by Kao Corporation): | 1 part |
| Calcium acetate monohydrate: | 1.76 parts |
| Resin emulsion A of ethylene vinyl acetate: | 10 parts |
| PROXEL LV: preservatives and fungicides, manufactured by AVECIA GROUP: | 0.1 parts |
| Deionized water: | 77.14 parts |

Liquid Composition Examples 2-43 and Liquid Composition Comparative Examples 1-9

The liquid compositions of the liquid composition Examples 2-43 and the liquid compositions of the liquid composition Comparative Example 1-9 were prepared in the same manner as in the liquid composition Example 1 except that the recipes shown in Table 1 were used.

Products available on the market were used for resins in Tables, which are not specified in the above.
- Ethylene-vinyl acetate resin B: SUMIKAFLEX™ 951HQ, manufactured by Sumika Chemtex Company, Limited (Tg: −25 degrees C.)
- Ethylene-vinyl acetate resin C: SUMIKAFLEX™ 408HQE, manufactured by Sumika Chemtex Company, Limited (Tg: −30 degrees C.)
- Ethylene-vinyl acetate-vinyl chloride copolymer resin A: SUMIKAFLEX™ 808HQ, manufactured by Sumika Chemtex Company, Limited (Tg: 25 degrees C.)
- Ethylene-vinyl acetate-vinyl chloride copolymer resin B: SUMIKAFLEX™ 850HQ, manufactured by Sumika Chemtex Company, Limited (Tg: 30 degrees C.)
- Vinyl acetate-acrylic resin A: Vinyblan 1225, manufactured by Nissin Chemical Industry Co., Ltd. (Tg: 9 degrees C.)
- Styrenebutadiene resin A: NALSTAR SR-130, manufactured by NIPPON A&L INC (Tg: −1 degree C.)

In addition, the anionic resins and cationic resins shown in Table 1 are as follows.

Anionic resin: TAKELAC™ W-5661 (urethane resin, manufactured by Mitsui Chemicals, Inc.)

Cationic resin: Arrow Base CB-1200 (polyolefin resin), manufactured by UnitiKA LTD.

Evaluation of Storage Stability of Liquid Component

The prepared liquid composition was placed in a sealed container and still left in a constant temperature tank at 80 degrees C. for two weeks. The storage stability of the liquid composition was evaluated by viscosity change before and after the storage.

The evaluation was determined according to the following criteria and E (Excellent) and G (Good) are allowable.

Evaluation Criteria

E (Excellent): Change rate of viscosity before and after storage within 10 percent G (Good): Change rate of viscosity before and after storage greater than 10 percent to 20 percent M (Marginal): Change rate of viscosity before and after storage greater than 20 percent to 30 percent P (Poor): Change rate of viscosity before and after storage greater than 30% or agglomeration occurs Non-Printed Site Lamination Evaluation The prepared liquid composition was applied to OPP film and PET film by a bar coater No. 1 to dry the liquid composition at 80 degrees C.

Additives for dry lamination (main agent: TM-320/curing agent CAT-13B, manufactured by Toyo-Morton, Ltd.) was applied thereto by a bar coater No. 4. Thereafter, cast polypolypropylene (CPP) (PYLEN® P1128, manufactured by TOYOBO CO., LTD.) was attached followed by 48-hour aging at 40 degrees C.

The laminated matter was cut to 15 mm width and subject to T-peel testing to make evaluation according to the following criteria. E(Excellent) and G(Good) are allowable.

Evaluation Criteria

E (Excellent): 5 N/15 mm or greater

G (Good): 3 N/15 mm to less than 5 N/15 mm

M (Marginal): 1 N/15 mm to less than 3 N/15 mm

P (Poor): Less than 1 N/15 mm

The manufacturer and the grade of each film used in the substrate attachability test are as follows.

OPP (oriented PolyPolypropylene): PYLEN® P2102, manufactured by TOYOBO CO., LTD.

PET (polyethylene terephthalate): ESPET® E5100, manufactured by TOYOBO CO., LTD.

The liquid composition Comparative Example 1 was gelated the instant the aqueous solution of calcium acetate and the anionic resin were mixed and could not be applied to film. Naturally, non-printed site lamination evaluation was not possible. The liquid composition Comparative Example 7 was gelated in the same manner as in the case of the liquid composition Comparative Example 1 and could not be applied to film. Naturally, non-printed site lamination evaluation was not possible.

TABLE 1

| | | Liquid composition Example No. | | | | | | |
|---|---|---|---|---|---|---|---|---|
| | Component | 1 | 2 | 3 | 4 | 5 | 6 | 7 |
| Mixing ratio | 1,2-propane diol: | 10.00 | | 5.00 | | | 3.00 | 10.00 |
| | 1,2-butane diol | | 10.00 | | | 10.00 | 3.00 | |
| | 2,3-butane diol | | | 5.00 | 10.00 | | 3.00 | |
| | 4-methyl-1,2-pentanediol | | | 2.00 | | 2.00 | 3.00 | |
| | 3-methoxy-3-methyl-1-butanol | | | | 10.00 | 10.00 | 3.00 | |

TABLE 1-continued

| | Component | 1 | 2 | 3 | 4 | 5 | 6 | 7 |
|---|---|---|---|---|---|---|---|---|
| | EMALGEN LS-106 FS-300 | 1.00 | 1.00 | 1.00 | 1.00 | 1.00 | 1.00 | 1.00 |
| | Calcium acetate monohydrate | 1.76 | | 7.05 | | | | 1.76 |
| | Calcium chloride hexahydrate | | 1.10 | | | | | |
| | Magnesium sulfate (anhydrous) | | | | | 6.02 | 1.20 | |
| | Nickel chloride hexahydrate | | | | | | 7.13 | |
| | Zinc sulfate (anhydrous) | | | | | | | |
| | Aluminum sulfate tetradecahydrate | | | | | | | |
| | Ethylene-vinyl acetate resin A (content of solid portion) | 10.00 | 5.00 | | | | | |
| | Ethylene-vinyl acetate resin B (content of solid portion) | | | 15.00 | | | | |
| | Ethylene-vinyl acetate resin C (content of solid portion) | | | | | | | |
| | Ethylene-vinyl acetate-vinyl chloride copolymer resin A (content of solid portion) | | | | | | 0.50 | |
| | Ethylene-vinyl acetate-vinyl chloride copolymer resin B (content of solid portion) | | | | | | | |
| | Vinyl acetate-acrylic resin A (content of solid portion) | | | | 20.00 | | | |
| | Urethane resin A (content of solid portion) | | | | | 3.00 | | |
| | Styrenebutadiene resin A (content of solid portion) | | | | | | | 10.00 |
| | Polyester Resin A (content of solid portion) | | | | | | | |
| | PROXEL LV | 0.10 | 0.10 | 0.10 | 0.10 | 0.10 | 0.10 | 0.10 |
| | Water | Rest | Rest | Rest | Rest | Rest | Rest | Rest |
| | Total (parts) | 100.00 | 100.00 | 100.00 | 100.00 | 100.00 | 100.00 | 100.00 |
| Evaluation Results | Evaluation of storage stability | E | E | E | E | E | E | E |
| | Non-printed site laminate evaluation (OPP) | E | E | E | E | E | E | G |
| | Non-printed site laminate evaluation (PET) | E | E | E | E | E | E | G |

| | | Liquid composition Example No. | | | | | | |
|---|---|---|---|---|---|---|---|---|
| | Component | 8 | 9 | 10 | 11 | 12 | 13 | 14 |
| Mixing ratio | 1,2-propane diol | 10.00 | 10.00 | 10.00 | 10.00 | 10.00 | 10.00 | 10.00 |
| | 1,2-butane diol | | | | | | | |
| | 2,3-butane diol | | | | | | | |
| | 4-methyl-1,2-pentanediol | | | | | | | |
| | 3-methoxy-3-methyl-1-butanol | | | | | | | |
| | EMALGEN LS-106 FS-300 | 1.00 | 1.00 | 1.00 | 1.00 | 1.00 | 1.00 | 1.00 |
| | Calcium acetate monohydrate | 1.76 | | | 1.76 | 1.76 | 0.35 | 10.57 |
| | Calcium chloride hexahydrate | | | | | | | |
| | Magnesium sulfate (anhydrous) | | | | | | | |
| | Nickel chloride hexahydrate | | | | | | | |
| | Zinc sulfate (anhydrous) | | 3.23 | | | | | |

TABLE 1-continued

|  | Component | | | | | | | |
|---|---|---|---|---|---|---|---|---|
| | Aluminum sulfate tetradecahydrate | | | 12.60 | | | | |
| | Ethylene-vinyl acetate resin A (content of solid portion) | | 10.00 | 10.00 | 0.30 | 21.00 | 10.00 | 10.00 |
| | Ethylene-vinyl acetate resin B (content of solid portion) | | | | | | | |
| | Ethylene-vinyl acetate resin C (content of solid portion) | | | | | | | |
| | Ethylene-vinyl acetate-vinyl chloride copolymer resin A (content of solid portion) | | | | | | | |
| | Ethylene-vinyl acetate-vinyl chloride copolymer resin B (content of solid portion) | | | | | | | |
| | Vinyl acetate-acrylic resin A (content of solid portion) | | | | | | | |
| | Urethane resin A (content of solid portion) | | | | | | | |
| | Styrenebutadiene resin A (content of solid portion) | | | | | | | |
| | Polyester Resin A (content of solid portion) | 10.00 | | | | | | |
| | PROXEL LV | 0.10 | 0.10 | 0.10 | 0.10 | 0.10 | 0.10 | 0.10 |
| | Water | Rest | Rest | Rest | Rest | Rest | Rest | Rest |
| | Total (parts) | 100.00 | 100.00 | 100.00 | 100.00 | 100.00 | 100.00 | 100.00 |
| Evaluation Results | Evaluation of storage stability | E | G | G | E | G | E | G |
| | Non-printed site laminate evaluation (OPP) | G | E | E | G | G | E | G |
| | Non-printed site laminate evaluation (PET) | E | E | E | G | E | E | E |

| | | Liquid composition Example No. | | | | | | |
|---|---|---|---|---|---|---|---|---|
| | Component | 15 | 16 | 17 | 18 | 19 | 20 | 21 |
| Mixing ratio | 1,2-propane diol | 10.00 | 10.00 | 10.00 | | 5.00 | | |
| | 1,2-butane diol | | | | 10.00 | | | 10.00 |
| | 2,3-butane diol | | | | | 5.00 | 10.00 | |
| | 4-methyl-1,2-pentanediol | | | | | 2.00 | | 2.00 |
| | 3-methoxy-3-methyl-1-butanol | | | | | | 10.00 | 10.00 |
| | EMULGEN LS-106 | 1.00 | 1.00 | 2.00 | | 1.50 | | 1.20 |
| | FS-300 | | | | 0.50 | | 0.70 | |
| | Calcium acetate monohydrate | 1.76 | 1.76 | 1.76 | | 7.05 | | |
| | Calcium chloride hexahydrate | | | | 1.10 | | | |
| | Magnesium sulfate (anhydrous) | | | | | | 6.02 | 1.20 |
| | Nickel chloride hexahydrate | | | | | | | |
| | Zinc sulfate (anhydrous) | | | | | | | |
| | Aluminum sulfate tetradecahydrate | | | | | | | |
| | Ethylene-vinyl acetate resin A (content of solid portion) | | | 10.00 | 5.00 | | | |
| | Ethylene-vinyl acetate resin B (content of solid portion) | | | | | 15.00 | | |
| | Ethylene-vinyl acetate resin C (content of solid portion) | 10.00 | | | | | | |

TABLE 1-continued

|  | Component | | | | | | | |
|---|---|---|---|---|---|---|---|---|
| | Ethylene-vinyl acetate-vinyl chloride copolymer resin A (content of solid portion) | | | | | | | |
| | Ethylene-vinyl acetate-vinyl chloride copolymer resin B (content of solid portion) | 10.00 | | | | | | |
| | Vinyl acetate-acrylic resin A (content of solid portion) | | | | | | 20.00 | |
| | Urethane resin A (content of solid portion) | | | | | | | 3.00 |
| | Styrenebutadiene resin A (content of solid portion) | | | | | | | |
| | Polyester Resin A (content of solid portion) | | | | | | | |
| | PROXEL LV | 0.10 | 0.10 | 0.10 | 0.10 | 0.10 | 0.10 | 0.10 |
| | Water | Rest | Rest | Rest | Rest | Rest | Rest | Rest |
| | Total content (parts) | 100.00 | 100.00 | 100.00 | 100.00 | 100.00 | 100.00 | 100.00 |
| Evaluation Results | Evaluation of storage stability | G | E | E | E | E | E | E |
| | Non-printed site laminate evaluation (OPP) | E | G | E | E | E | E | E |
| | Non-printed site laminate evaluation (PET) | E | G | E | E | E | E | E |

| | | Liquid composition Example No | | | | | | |
|---|---|---|---|---|---|---|---|---|
| | Component | 22 | 23 | 24 | 25 | 26 | 27 | 28 |
| Mixing ratio | 1,2-propane diol: | 3.00 | 10.00 | | 5.00 | | | 3.00 |
| | 1,2-butane diol | 3.00 | | 10.00 | | | 10.00 | 3.00 |
| | 2,3-butane diol | 3.00 | | | 5.00 | 10.00 | | 3.00 |
| | 4-methyl-1,2-pentanediol | 3.00 | | | 2.00 | | 2.00 | 3.00 |
| | 3-methoxy-3-methyl-1-butanol | 3.00 | | | | 10.00 | 10.00 | 3.00 |
| | EMULGEN LS-106 | | 2.00 | | 1.50 | | 1.20 | |
| | FS-300 | 2.50 | | 0.50 | | 0.70 | | 2.50 |
| | Calcium acetate monohydrate | | 1.76 | | 7.05 | | | |
| | Calcium chloride hexahydrate | | | 1.10 | | | | |
| | Magnesium sulfate (anhydrous) | | | | | 6.02 | 1.20 | |
| | Nickel chloride hexahydrate | 7.13 | | | | | | 7.13 |
| | Zinc sulfate (anhydrous) | | | | | | | |
| | Aluminum sulfate tetradecahydrate | | | | | | | |
| | Ethylene-vinyl acetate resin A (content of solid portion) | | 5.00 | 3.00 | | | | |
| | Ethylene-vinyl acetate resin B (content of solid portion) | | 5.00 | | 8.00 | | | |
| | Ethylene-vinyl acetate resin C (content of solid portion) | | | | | | 2.00 | |
| | Ethylene-vinyl acetate-vinyl chloride copolymer resin A (content of solid portion) | 0.50 | | | | | | 0.50 |
| | Ethylene-vinyl acetate-vinyl chloride copolymer resin B (content of solid portion) | | | | | 10.00 | | |

TABLE 1-continued

| | Component | | | | | | | |
|---|---|---|---|---|---|---|---|---|
| | Vinyl acetate-acrylic resin A (content of solid portion) | | | 2.00 | | | | |
| | Urethane resin A (content of solid portion) | | | | | 8.00 | 2.00 | |
| | Styrenebutadiene resin A (content of solid portion) | | | | | | 10.00 | 1.00 |
| | Polyester Resin A (content of solid portion) | | | | | | | |
| | PROXEL LV | 0.10 | 0.10 | 0.10 | 0.10 | 0.10 | 0.10 | 0.10 |
| | Water | Rest | Rest | Rest | Rest | Rest | Rest | Rest |
| | Total content (parts) | 100.00 | 100.00 | 100.00 | 100.00 | 100.00 | 100.00 | 100.00 |
| Evaluation Results | Evaluation of storage stability | E | E | E | E | E | E | E |
| | Non-printed site laminate evaluation (OPP) | E | E | E | E | E | E | E |
| | Non-printed site laminate evaluation (PET) | E | E | E | E | E | E | E |

| | | Liquid composition Example No. | | | | | | |
|---|---|---|---|---|---|---|---|---|
| | Component | 29 | 30 | 31 | 32 | 33 | 34 | 35 |
| Mixing ratio | 1,2-propane diol: | | 5.00 | | | 3.00 | 10.00 | 10.00 |
| | 1,2-butane diol | 10.00 | | | 10.00 | 3.00 | | |
| | 2,3-butane diol | | 5.00 | 10.00 | | 3.00 | | |
| | 4-methyl-1,2-pentanediol | | 2.00 | | 2.00 | 3.00 | | |
| | 3-methoxy-3-methyl-1-butanol | | | 10.00 | 10.00 | 3.00 | | |
| | EMULGEN LS-106 | 1.00 | 1.00 | 1.00 | 1.00 | 1.00 | 1.00 | 1.00 |
| | Aluminum sulfate tetradecahydrate | | 25.22 | | | | 2.96 | 2.96 |
| | Polyaluminum chloride [Al$_2$(OH)nCl$_{6-n}$]$_m$ (1 ≤ n ≤ 5, m ≤ 10) | 105.67 | | | | | | |
| | Aluminum phosphate AlPO$_4$ | | | 6.10 | 1.22 | | | |
| | Aluminum potassium sulfate dodecahydrate AlK(SO$_4$)$_2$·12H$_2$O | | | | | 14.23 | | |
| | Iron(III) Sulfate Pentahydrate | | | | | | | |
| | Potassium iron alum FeK(SO$_4$)$_2$·12H$_2$O | | | | | | | |
| | Ethylene-vinyl acetate resin A (content of solid portion) | 5.00 | | | | | | |
| | Ethylene-vinyl acetate resin B (content of solid portion) | | 15.00 | | | | | |
| | Ethylene-vinyl acetate resin C (content of solid portion) | | | | | | | |
| | Ethylene-vinyl acetate-vinyl chloride copolymer resin A (content of solid portion) | | | | | 0.50 | | |
| | Ethylene-vinyl acetate-vinyl chloride copolymer resin B (content of solid portion) | | | | | | | |
| | Vinyl acetate-acrylic resin A (content of solid portion) | | | 20.00 | | | | |
| | Urethane resin A (content of solid portion) | | | | 3.00 | | | |
| | Styrenebutadiene resin A (content of solid portion) | | | | | | 10.00 | |
| | Polyester Resin A (content of solid portion) | | | | | | | 10.00 |

TABLE 1-continued

|  |  |  |  |  |  |  |  |
|---|---|---|---|---|---|---|---|
|  | PROXEL LV | 0.10 | 0.10 | 0.10 | 0.10 | 0.10 | 0.10 | 0.10 |
|  | Water | Rest | Rest | Rest | Rest | Rest | Rest | Rest |
|  | Total content (parts) | 100.00 | 100.00 | 100.00 | 100.00 | 100.00 | 100.00 | 100.00 |
| Evaluation Results | Evaluation of storage stability | G | G | G | G | G | G | G |
|  | Non-printed site laminate evaluation (OPP) | E | E | E | E | E | G | G |
|  | Non-printed site laminate evaluation (PET) | E | E | E | E | E | G | E |

| | | Liquid composition Example No. | | | | | | | |
|---|---|---|---|---|---|---|---|---|---|
| | Component | 36 | 37 | 38 | 39 | 40 | 41 | 42 | 43 |
| Mixing ratio | 1,2-propane diol | 10.00 | 10.00 | 10.00 | 10.00 | 10.00 | 10.00 | 10.00 | 10.00 |
| | 1,2-butane diol | | | | | | | | |
| | 2,3-butane diol | | | | | | | | |
| | 4-methyl-1,2-pentanediol | | | | | | | | |
| | 3-methoxy-3-methyl-1-butanol | | | | | | | | |
| | EMULGEN LS-106 | 1.00 | 1.00 | 1.00 | 1.00 | 1.00 | 1.00 | 1.00 | 1.00 |
| | Aluminum sulfate tetradecahydrate | | | 2.96 | 2.96 | 1.26 | 37.82 | 2.96 | 2.96 |
| | Polyaluminum chloride [Al$_2$(OH)nCl$_{6-n}$]$_m$ (1 ≤ n ≤ 5, m ≤ 10) | | | | | | | | |
| | Aluminum phosphate AlPO$_4$ | | | | | | | | |
| | Aluminum potassium sulfate dodecahydrate AlK(SO$_4$)$_2$•12H$_2$O | | | | | | | | |
| | Iron(III) Sulfate Pentahydrate | 9.80 | | | | | | | |
| | Potassium iron alum FeK(SO$_4$)$_2$•12H$_2$O | | 10.06 | | | | | | |
| | Ethylene-vinyl acetate resin A (content of solid portion) | 10.00 | 10.00 | 0.30 | 21.00 | 10.00 | 10.00 | | |
| | Ethylene-vinyl acetate resin B (content of solid portion) | | | | | | | | |
| | Ethylene-vinyl acetate resin C (content of solid portion) | | | | | | | 10.00 | |
| | Ethylene-vinyl acetate-vinyl chloride copolymer resin A (content of solid portion) | | | | | | | | |
| | Ethylene-vinyl acetate-vinyl chloride copolymer resin B (content of solid portion) | | | | | | | | 10.00 |
| | Vinyl acetate-acrylic resin A (content of solid portion) | | | | | | | | |
| | Urethane resin A (content of solid portion) | | | | | | | | |

TABLE 1-continued

|  |  |  |  |  |  |  |  |  |  |
|---|---|---|---|---|---|---|---|---|---|
|  | Styrenebutadiene resin A (content of solid portion) |  |  |  |  |  |  |  |  |
|  | Polyester Resin A (content of solid portion) |  |  |  |  |  |  |  |  |
|  | PROXEL LV | 0.10 | 0.10 | 0.10 | 0.10 | 0.10 | 0.10 | 0.10 | 0.10 |
|  | Water | Rest | Rest | Rest | Rest | Rest | Rest | Rest | Rest |
|  | Total content (parts) | 100.00 | 100.00 | 100.00 | 100.00 | 100.00 | 100.00 | 100.00 | 100.00 |
| Evaluation Results | Evaluation of storage stability | G | G | G | G | G | G | G | G |
|  | Non-printed site laminate evaluation (OPP) | E | E | G | G | E | G | G | G |
|  | Non-printed site laminate evaluation (PET) | E | E | G | E | E | G | E | G |

|  |  | Liquid other monomers Example No. |  |  |  |  |  |
|---|---|---|---|---|---|---|---|
|  | Component | 1 | 2 | 3 | 4 | 5 | 6 |
| Mixing ratio | 1,2-propane diol | 10.00 | 10.00 | 10.00 | 10.00 |  | 3.00 |
|  | EMULGEN LS-106 | 1.00 | 1.00 | 1.00 | 1.00 | 1.00 | 1.00 |
|  | Calcium acetate monohydrate | 1.76 | 1.76 | — | 1.76 |  |  |
|  | Sodium acetate (anhydrous) |  |  | 2.72 |  | 2.72 |  |
|  | Ethylene-vinyl acetate resin A (content of solid portion) |  |  |  |  | 10.00 | 10.00 |
|  | Anionic resin (content of solid portion) | 10.00 |  |  |  |  |  |
|  | Cationic resin (content of solid portion) |  |  | 10.00 | 10.00 |  |  |
|  | PROXEL LV | 0.10 | 0.10 | 0.10 | 0.10 | 0.10 | 0.10 |
|  | Water | Rest | Rest | Rest | Rest | Rest | Rest |
|  | Total content (parts) | 100.00 | 100.00 | 100.00 | 100.00 | 100.00 | 100.00 |
| Evaluation Results | Evaluation of storage stability | P | E | M | M | E | E |
|  | Non-printed site laminate evaluation (OPP) | Unable to evaluate | M | E | E | E | E |
|  | Non-printed site laminate evaluation (PET) | Unable to evaluate | M | E | E | E | E |

|  |  | Liquid composition Comparative Example No. |  |  |
|---|---|---|---|---|
|  | Component | 7 | 8 | 9 |
| Mixing ratio | 1,2-propane diol | 10.00 | 10.00 | 10.00 |
|  | EMULGEN LS-106 | 1.00 | 1.00 | 1.00 |
|  | Aluminum sulfate tetradecahydrate | 12.60 | 12.60 | 12.60 |
|  | Sodium acetate (anhydrous) |  |  |  |
|  | Ethylene-vinyl acetate resin A (content of solid portion) |  |  |  |
|  | Anionic resin (content of solid portion) |  | 10.00 |  |
|  | Cationic resin (content of solid portion) |  |  | 10.00 |
|  | PROXEL LV | 0.10 | 0.10 | 0.10 |
|  | Water | Rest | Rest | Rest |
|  | Total content (parts) | 100.00 | 100.00 | 100.00 |
| Evaluation Results | Evaluation of storage stability | P | E | M |
|  | Non-printed site laminate evaluation (OPP) | Unable to evaluate | M | E |
|  | Non-printed site laminate evaluation (PET) | Unable to evaluate | M | E |

Preparation of Pigment Dispersion

Preparation of Black Pigment Dispersion A 100 g of carbon black (SEAST SP, SRF-LS, manufactured by TOKAI CARBON CO., LTD.) was added to 3,000 mL of 2.5 N (normal) sodium hypochlorite followed by stirring at 300 rpm at 60 degrees C. Subsequent to reaction for ten hours for oxidation, a pigment in which a carboxylic acid group was placed on the surface of carbon black was obtained.

The reaction liquid was filtrated and the thus-filtered carbon black was neutralized by sodium hydroxide solution followed by ultra-filtration.

Thereafter, subsequent to ultrafiltration by dialysis membrane using the pigment dispersion and deionized water followed by ultrasonic dispersion, black pigment dispersion A having a volume average particle diameter of 100 nm with a solid portion concentrated to 20 percent was obtained.

Preparation of Black Pigment Dispersion B

Black pigment dispersion B having a volume average particle diameter of 125 nm was obtained in the same manner as in the case of the preparation of the black pigment dispersion A except that the carbon black was changed to SEAST TA (FT grade).

Preparation of Black Pigment Dispersion C

Black pigment dispersion C having a volume average particle diameter of 24 nm was obtained in the same manner as in the case of the preparation of the black pigment dispersion A except that the carbon black was changed to SEAST KH (N39).

Preparation of Black Pigment Dispersion D

Black pigment dispersion D having a volume average particle diameter of 110 nm was obtained in the same manner as in the case of the preparation of the black pigment dispersion A except that the carbon black was changed to Aqua-Black® 162 (manufactured by TOKAI CARBON CO LTD.).

Preparation of Black Pigment Dispersion E

Black pigment dispersion D having a volume average particle diameter of 30 nm was obtained in the same manner as in the case of the preparation of the black pigment dispersion A except that the carbon black was changed to general color RCF#30 (manufactured by Mitsubishi Chemical Corporation).

Preparation of Cyan Pigment Dispersion A

Cyan pigment dispersion A having a volume average particle diameter of 62 nm was obtained in the same manner as in the case of the preparation of the black pigment dispersion A except that the coloring material was changed to Hostaperm Blue B4G (manufactured by Clariant).

Preparation of Cyan Pigment Dispersion B

Cyan pigment dispersion B having a volume average particle diameter of 75 nm was obtained in the same manner as in the case of the preparation of the black pigment dispersion A except that the coloring material was changed to copper phthalocyanine pigment (LX4033, C.I. Pigment 15:4, manufactured by TOYO INK CO., LTD.).

Preparation of Magenta Pigment Dispersion A

Magenta pigment dispersion A having a volume average particle diameter of 87 nm was obtained in the same manner as in the case of the preparation of the black pigment dispersion A except that the coloring material was changed to Hostaperm Pink E02 (manufactured by Clariant).

Preparation of Magenta Pigment Dispersion B

Magenta pigment dispersion B having a volume average particle diameter of 73 nm was obtained in the same manner as in the case of the preparation of the black pigment dispersion A except that the coloring material was changed to Pigment Red 122 (manufactured by Sun Chemical).

Preparation of Yellow Pigment Dispersion A

Yellow pigment dispersion A having a volume average particle diameter of 75 nm was obtained in the same manner as in the case of the preparation of the black pigment dispersion A except that the coloring material was changed to Hansa Brilliant Yellow 5GX03 (manufactured by Clariant).

Preparation of Yellow Pigment Dispersion B

Yellow pigment dispersion B having a volume average particle diameter of 82 nm was obtained in the same manner as in the case of the preparation of the black pigment dispersion A except that the coloring material was changed to Pigment Yellow 74 (Yellow No. 46, manufactured by Dainichiseika Color & Chemicals Mfg. Co., Ltd.).

Preparation of White Pigment Dispersion A 25 g of titanium oxide (STR-100W, manufactured by Sakai Chemical Industry Co., Ltd.), 5 g of pigment dispersant (TEGO Dispers 651, manufactured by Evonik Japan Co., Ltd.), and 70 g of water were mixed followed by dispersion using a bead mill (research labo, manufactured by Shinmaru Enterprises Corporation) with zirconia beads having a diameter of 0.3 mm and a filling ratio of 60 percent at 8 m/s for five minutes to obtain a white pigment dispersion A having a volume average particle diameter of 285 nm.

Preparation of White Pigment Dispersion B

White pigment dispersion B having a volume average particle diameter of 142 nm was obtained in the same manner as in the case of the preparation of the white pigment dispersion A except that titanium oxide was changed to STA-100A.

Preparation of White Pigment Dispersion C

White pigment dispersion C having a volume average particle diameter of 142 nm was obtained in the same manner as in the case of the preparation of the white pigment dispersion A except that titanium oxide was changed to STR-60N.

Preparation of White Pigment Dispersion D (Hollow Resin Particle Dispersion)

A product (ROPAQUE™ ULTRA, styrene-acrylic copolymer hollow pigment emulsion, average particle diameter (D50): 380 nm, solid portion concentration: 30.0 percent, manufactured by Rohm and Haas Electronic Materials K.K.) was used as the hollow resin particle dispersion.

Preparation of White Pigment Dispersion E (Hollow Inorganic Resin Particle Dispersion)

10.0 g of DISPERBYK-2008 (acrylic copolymer, effective component 60 percent, manufactured by BYK) was dissolved in 294.0 g of highly pure water in a beaker. Thereafter, while the solution was stirred by an excel auto homogenizer (manufactured by Nippon Seiki Co., Ltd.) at 5,000 rotation per minute (rpm) for 30 minutes, 50.0 g of hollow inorganic particles (SiliNax™, primary particle diameter of from 80 to 130 nm, silica film thickness: 5 to 15 nm, manufactured by Nittetsu Mining Co., Ltd.) was divided into ten and admixed until no block was observed. Thereafter, the rotation was gradually sped up to 10,000 rpm and stirred for 30 minutes.

While cooling down the thus-obtained pigment liquid dispersion water, the pigment liquid dispersion was treated with an ultrasonic homogenizer (US-300T, tip diameter 26, manufactured by NISSEI Corporation) at 200 µA for one hour. Subsequent to filtration with a membrane filter (cellulose acetate film) of 5 µm, hollow inorganic particle liquid dispersion was obtained in which the hollow inorganic particle accounted for 14.1 percent by mass. The average particle diameter (D50) of the dispersion particle in the obtained dispersion was 300 nm as measured by a particle size distribution measuring instrument (Microtrac UPA-EX150, manufactured by NIKKISO CO., LTD.).

Preparation Method of Ink

The recipe shown in Table 2 was mixed and stirred to prepare ink. The non-white ink was filtrated by a polypropylene filter of 0.2 µm and the white ink was filtrated by a polypropylene filter of 0.5 µm.

The surfactant used was as follows.

FS-300, manufactured by E. I. du Pont de Nemours and Company)

The resin used was as follows.

Urethane resin A: SUPER FLEX 210 (Tg: 41 degrees C., manufactured by DKS Co. Ltd.)

Urethane resin B: SUPER FLEX 420 (Tg: −10 degrees C., manufactured by DKS Co. Ltd.)

Acrylic resin A: VONCOAT CF-6140 (Tg: 12 degrees C., manufactured by DIC)

Styreneacrylic resin A: Vinyblan 2685 (Tg: 50 degrees C., manufactured by Nissin Chemical Industry Co., Ltd.)

Styrene acrylic resin B: VONCOAT CG-8400 (Tg: 25 degrees C., manufactured by DIC)

Polyester resin A: ELITEL® KA-5034 (Tg: 67 degrees C., manufactured by UNITIKA LTD.)

Vinyl chloride resin A: Vinyblan 735, (Tg: 42 degrees C., manufactured by Nissin Chemical Industry Co., Ltd.)

Vinyl chloride-vinyl acetate copolymer resin A: SOLBIN TA3 (Tg: 65 degrees C., manufactured by Nissin Chemical Industry Co., Ltd.)

TABLE 2

| Component | | Ink preparation example No | | | | | | |
|---|---|---|---|---|---|---|---|---|
| | | 1 | 2 | 3 | 4 | 5 | 6 | 7 |
| Black pigment dispersion A | Content of solid portion | 4 | 4 | 4 | 4 | 4 | | |
| Black pigment dispersion B | | | | | | | 4 | |
| Black pigment dispersion C | | | | | | | | 4 |
| Urethane resin A | | 7 | | | | | 7 | 7 |
| Urethane resin B | | | | | | | | |
| Acrylic resin A | | | 2 | | | | | |
| Styreneacrylic resin A | | | | 8 | | | | |
| Styreneacrylic resin B | | | | | | | | |
| Polyester resin A | | | | | | 6 | | |
| Vinylchloride resin A | | | | | | | | |
| Vinylchloride-vinylacetate copolymer resin A | | | | | | | | |
| FS-300 | | 2 | 2 | 2 | 2 | 2 | 2 | 2 |
| 1,2-propane diol | | 30 | 30 | 30 | 30 | 30 | 30 | 30 |
| Diethylene glycol monobutyl ether | | 5 | 5 | 5 | 5 | 5 | 5 | 5 |
| PROXEL LV (manufactured by AVECIA GROUP) | | 0.1 | 0.1 | 0.1 | 0.1 | 0.1 | 0.1 | 0.1 |
| Deionized water | | Rest | Rest | Rest | Rest | Rest | Rest | Rest |
| Total amount | | 100 | 100 | 100 | 100 | 100 | 100 | 100 |

| Component | | Ink preparation example No. | | | | | |
|---|---|---|---|---|---|---|---|
| | | 8 | 9 | 10 | 11 | 12 | 13 |
| Black pigment dispersion A | Content of solid portion | 4 | 4 | 4 | 4 | 4 | 4 |
| Black pigment dispersion B | | | | | | | |
| Black pigment dispersion C | | | | | | | |
| Urethane resin A | | | | | 1.6 | 12.4 | |
| Urethane resin B | | | | | | 7 | |
| Acrylic resin A | | | | | | | |
| Styreneacrylic resin A | | | | | | | |
| Styreneacrylic resin B | | | | | | | 7 |
| Polyester resin A | | | | | | | |
| Vinylchloride resin A | | | 7 | | | | |
| Vinylchloride-vinylacetate copolymer resin A | | | | 7 | | | |

TABLE 2-continued

|  | Ink preparation example 14 | Ink preparation example 15 | Ink preparation example 16 | Ink preparation example 17 | Ink preparation example 18 |
|---|---|---|---|---|---|
| FS-300 | 2 | 2 | 2 | 2 | 2 | 2 |
| 1,2-propane diol | 30 | 30 | 30 | 30 | 30 | 30 |
| Diethylene glycol monobutyl ether | 5 | 5 | 5 | 5 | 5 | 5 |
| PROXEL LV (manufactured by AVECIA GROUP) | 0.1 | 0.1 | 0.1 | 0.1 | 0.1 | 0.1 |
| Deionized water | Rest | Rest | Rest | Rest | Rest | Rest |
| Total amount | 100 | 100 | 100 | 100 | 100 | 100 |

|  | Ink preparation example 14 | Ink preparation example 15 | Ink preparation example 16 | Ink preparation example 17 | Ink preparation example 18 |
|---|---|---|---|---|---|
| Black pigment dispersion D (as solid portion) | 4 |  |  |  |  |
| Black pigment dispersion E (as solid portion) |  | 4 |  |  |  |
| Cyan pigment dispersion A (as solid portion) |  |  | 4 |  |  |
| Magenta pigment dispersion A (as solid portion) |  |  |  | 4 |  |
| Yellow pigment dispersion A (as solid portion) |  |  |  |  | 4 |
| Urethane resin A (content of solid portion) | 7 | 7 | 7 | 7 | 7 |
| FS-300 | 2 | 2 | 2 | 2 | 2 |
| 1,2-propane diol | 30 | 30 | 30 | 30 | 30 |
| Diethylene glycol monobutyl ether | 5 | 5 | 5 | 5 | 5 |
| PROXEL LV (manufactured by AVECIA GROUP) | 0.1 | 0.1 | 0.1 | 0.1 | 0.1 |
| Deionized water | Rest | Rest | Rest | Rest | Rest |
| Total content (parts) | 100 | 100 | 100 | 100 | 100 |

|  | Ink preparation example 19 | Ink preparation example 20 | Ink preparation example 21 | Ink preparation example 22 | Ink preparation example 23 | Ink preparation example 24 |
|---|---|---|---|---|---|---|
| White pigment dispersion A (as solid portion) | 7 |  |  |  |  |  |
| White pigment dispersion B (as solid portion) |  | 7 |  |  |  |  |
| White pigment dispersion C (as solid portion) |  |  | 7 |  |  |  |
| Cyan pigment dispersion B (as solid portion) |  |  |  | 4 |  |  |
| Magenta pigment dispersion B (as solid portion) |  |  |  |  | 4 |  |
| Yellow pigment dispersion B (as solid portion) |  |  |  |  |  | 4 |

TABLE 2-continued

| | | | | | | |
|---|---|---|---|---|---|---|
| Urethane resin A (content of solid portion) | 7 | 7 | 7 | 7 | 7 | 7 |
| FS-300 | 2 | 2 | 2 | 2 | 2 | 2 |
| 1,2-propane diol | 30 | 30 | 30 | 30 | 30 | 30 |
| Diethylene glycol monobutyl ether | 5 | 5 | 5 | 5 | 5 | 5 |
| PROXEL LV (manufactured by AVECIA GROUP) | 0.1 | 0.1 | 0.1 | 0.1 | 0.1 | 0.1 |
| Deionized water | Rest | Rest | Rest | Rest | Rest | Rest |
| Total content (parts) | 100 | 100 | 100 | 100 | 100 | 100 |

| | Ink preparation example 25 | Ink preparation example 26 |
|---|---|---|
| White pigment dispersion D (as solid portion) | 7 | |
| White pigment dispersion E (as solid portion) | | 7 |
| White pigment dispersion A (as solid portion) | | |
| Cyan pigment dispersion B (as solid portion) | | |
| Magenta pigment dispersion B (as solid portion) | | |
| Yellow pigment dispersion B (as solid portion) | | |
| Urethane resin A (content of solid portion) | 7 | 7 |
| FS-300 | 2 | 2 |
| 1,2-propane diol | 30 | 30 |
| Diethylene glycol monobutyl ether | 5 | 5 |
| PROXEL LV (manufactured by AVECIA GROUP) | 0.1 | 0.1 |
| Deionized water | Rest | Rest |
| Total content (parts) | 100 | 100 |

The inks of ink preparation examples 1-13 were evaluated according to the following criteria.

Evaluation of Discharging Stability

An inkjet printer (remodeled based on IPSiO GXe5500 manufactured by Ricoh Company, Ltd.) illustrated in FIG. 3 was filled with each ink and left at 25 degrees C. and 15 percent RH for one hour with no capping. Thereafter, a nozzle checker pattern was printed and visually observed to evaluate non-discharging and disturbance of discharging according to the following evaluation criteria. The results are shown in Table 3. E and G are allowable.

E (Excellent): No non-discharging or no disturbance at all

G (Good): Slight discharging disturbance

M (Marginal): Some nozzles with non-discharging

P (Poor): Many nozzle with non-discharging

TABLE 3

| | Ink preparation example 1 | Ink preparation example 2 | Ink preparation example 3 | Ink preparation example 4 | Ink preparation example 5 | Ink preparation example 6 | Ink preparation example 7 |
|---|---|---|---|---|---|---|---|
| Evaluation of Discharging Stability | E | E | E | E | E | G | E |

TABLE 3-continued

| | Ink preparation example 8 | Ink preparation example 9 | Ink preparation example 10 | Ink preparation example 11 | Ink preparation example 12 | Ink preparation example 13 |
|---|---|---|---|---|---|---|
| Evaluation of Discharging Stability | G | E | E | G | E | E |

Examples of Ink Set

Ink Set Examples 1-25

The liquid composition was applied and the ink was discharged according to the condition and the ink set (combination of the liquid composition and the ink is shown in Table 4) to evaluate lamination strength at printed site, image density, crushed negative character, abrasion resistance, and drying property. The evaluation results are shown in Table 4. The evaluation methods are described later.

Ink Set Examples 26-33

The ink set of the ink set Example 26 was evaluated using the ink set of the ink set Example 1 in the same manner as in the ink set Example 1 except that an OPP film (PYLEN® P2101, manufactured by TOYOBO CO., LTD.) having a corona discharging-treated surface (print surface) was used and the no corona discharging-treated surface (opposite side of the print surface) was used for evaluation.

The ink set of the ink set Example 27 was evaluated in the same manner using the ink set of the ink set Example 1 except that the drying condition was changed from 80 degrees C. for two minutes to room temperature for one night.

The ink set of the ink set Example 28 was evaluated in the same manner using the ink set of the ink set Example 1 except that the liquid composition was applied by a roll coater in such a manner that the attached amount was 0.3 g/m² instead of the bar coater No. 1 (reel line diameter: 0.025 mm, attached amount: 1.4 g/m²).

The ink set of the ink set Example 29 was evaluated in the same manner using the ink set of the ink set Example 1 except that the reel line diameter was changed from 0.035 mm to 0.025 mm and the attached amount was changed from 1.4 g/m² to 2.3 g/m².

The ink set of the ink set Example 30 was evaluated in the same manner using the ink set of the ink set Example 1 except that the amount of the ink discharged by the printer was changed from 10 g/m² to 3 g/m².

The ink set of the ink set Example 31 was evaluated in the same manner using the ink set of the ink set Example 1 except that the amount of the ink discharged by the printer was changed from 10 g/m² to 15 g/m².

The ink set of the ink set Example 32 was evaluated in the same manner using the ink set of the ink set Example 1 except that the liquid composition was applied by a roll coater in such a manner that the attached amount was 0.4 g/m² by speed adjustment instead of the bar coater No. 1 (reel line diameter: 0.025 mm, attached amount: 1.4 g/m²).

The ink set of the ink set Example 33 was evaluated in the same manner using the ink set of the ink set Example 1 except that the reel line diameter was changed from 0.025 mm to 0.03 mm and the attached amount was changed from 1.4 g/m² to 2.0 g/m².

The evaluation results of Examples 26-33 are shown in Table 4.

Ink Set Examples 34-38

The liquid composition was applied and the ink was discharged according to the condition and the ink set (combination of the liquid composition and the ink is shown in Table 4) to evaluate lamination strength at printed site, image density, crushed negative character, abrasion resistance, and drying property. The evaluation results are shown in Table 4. The evaluation results are described below.

Ink Set Examples 39-46

The liquid composition was applied and the ink was discharged according to the condition and the ink set (combination of the liquid composition and the ink is shown in Table 4) to evaluate lamination strength at printed site, image density, crushed negative character, abrasion resistance, drying property, color gamut, and white ink sedimentation property. The evaluation results are shown in Table 4. The evaluation results are described below.

In the ink set Example 39, the liquid composition and the black ink of the ink set Example 1 and the white ink of the ink preparation Example 19 were used for evaluation. The black ink and the white ink were applied in this order.

In the ink set Example 40, the liquid composition and the black ink of the ink set Example 1 and the white ink of the ink preparation Example 20 were used for evaluation. The black ink and the white ink were applied in this order.

In the ink set Example 41, the liquid composition and the black ink of the ink set Example 1 and the white ink of the ink preparation Example 21 were used for evaluation. The black ink and the white ink were applied in this order.

In the ink set Example 42, the liquid composition and the black ink of the ink set Example 1, and the cyan ink, the magenta ink, and the yellow ink of the ink preparation Examples 22-24, and the white ink of the ink preparation Example 19 were used for evaluation. The non-white inks and the white ink were applied in this order.

In the ink set Example 43, the liquid composition and the black ink of the ink set Example 1, and the cyan ink, the magenta ink, and the yellow ink of the ink preparation Examples 22-24 were used to evaluate the color gamut.

In the ink set Example 44, the liquid composition and the black ink of the ink set Example 1 and the white ink of the ink preparation Example 25 were used for evaluation. The black ink and the white ink were applied in this order.

In the ink set Example 45, the liquid composition and the black ink of the ink set Example 1 and the white ink of the ink preparation Example 26 were used for evaluation. The black ink and the white ink were applied in this order.

In the ink set Example 46, the liquid composition and the black ink of the ink set Example 1, the cyan ink, the magenta ink, and the yellow ink of the ink preparation Examples 22-24, and the white ink of the ink preparation Example 25 were used for evaluation. The non-white inks and the white ink were applied in this order.

Ink Set Examples 47-70

Using the ink set (combination of the liquid composition and the ink was shown in Table 4), the liquid composition was applied and the ink was discharged according to the condition to evaluate lamination strength at printed site, image density, crushed negative character, abrasion resistance, and drying property. The evaluation results were shown in Table 4. The evaluation results are described below.

Ink Set Examples 71-76

The ink set of the ink set Example 71 was evaluated in the same manner using the ink set of the ink set Example 10 except that an OPP film (PYLEN® P2101, manufactured by TOYOBO CO., LTD.) having a corona discharging-treated surface (print surface) was used and the no corona discharging-treated surface (opposite side of the print surface) was used for evaluation.

The ink set of the ink set Example 72 was evaluated in the same manner using the ink set of the ink set Example 10 except that the drying condition was changed from 80 degrees C. for two minutes to room temperature for one night.

The ink set of the ink set Example 73 was evaluated using the ink set of the ink set Example 10 in the same manner except that the liquid composition was applied by a roll coater in such a manner that the attached amount was 0.3 g/m² instead of the bar coater No. 1 (reel line diameter: 0.025 mm, attached amount: 1.4 g/m²).

The ink set of the ink set Example 74 was evaluated in the same manner using the ink set of the ink set Example 10 except that the reel line diameter was changed to from 0.035 mm to 0.025 mm and the attached amount was changed from 1.4 g/m² to 2.3 g/m² for bar coater No. 1.

The ink set of the ink set Example 75 was evaluated in the same manner using the ink set of the ink set Example 10 except that the amount of the ink discharged by the printer was changed from 10 g/m² to 3 g/m².

The ink set of the ink set Example 76 was evaluated in the same manner as in the ink set Example 10 except that the amount of the ink discharged by the printer was changed from 10 g/m² to 15 g/m².

The evaluation results of Examples 71-76 are shown in Table 4.

Ink Set Examples 77-81

The liquid composition was applied and the ink was discharged according to the condition and the ink set (combination of the liquid composition and the ink is shown in Table 4) to evaluate lamination strength at printed site, image density, crushed negative character, abrasion resistance, and drying property. The evaluation results are shown in Table 4. The evaluation results are described below.

Ink Set Examples 82-93

The liquid composition was applied and the ink was discharged according to the condition and the ink set (combination of the liquid composition and the ink is shown in Table 4) to evaluate lamination strength at printed site, image density, crushed negative character, abrasion resistance, and drying property. The evaluation results are shown in Table 4. The evaluation results are described below.

Ink Set Comparative Example 1-6

The liquid composition was applied and the ink was discharged according to the condition and the ink set (combination of the liquid composition and the ink is shown in Table 4) to evaluate lamination strength at printed site, image density, crushed negative character, abrasion resistance, and drying property. The evaluation results are shown in Table 4.

Each of the liquid composition was applied to the corona discharging-treated surface of an OPP film (PYLEN® P2102, manufactured by TOYOBO CO., LTD.) except for the ink set Examples 26 and 71. Moreover, after the surface reforming treatment shown in Table 4, each of the liquid composition was applied to the reformed surface under the condition shown in Table 4. As for the ink sets of the ink set Examples 26 and 71, each of the liquid composition was applied to the non-corona treated surface of an OPP film (PYLEN® P2102, manufactured by TOYOBO CO., LTD.) under the conditions shown in Table 4.

Evaluation of Printed Site Laminate Strength

An inkjet printer (IPSiO GXe5500, manufactured by Ricoh Company Ltd.) was filled with each prepared ink and the liquid composition was preliminarily applied to an OPP film (PYLEN® P2102, manufactured by TOYOBO CO., LTD.) by bar coater No. 1 and the OPP film was dried. Thereafter, a solid image was printed on the OPP film under the condition shown in Table 4 using the ink and dried. When using black ink and color ink, a mixed color solid image was printed.

Additives for dry lamination (main agent: TM-320/curing agent CAT-13B, manufactured by Toyo-Morton, Ltd.) was applied to the solid portion by a bar coater. Thereafter, cast polypolypropylene (CPP) (PYLEN® P1128, manufactured by TOYOBO CO., LTD.) was attached followed by 48-hour aging at 40 degrees C.

The laminated matter was cut to 15 mm width and peel strength thereof was measured. E (Excellent) and G (Good) are allowable.

Evaluation Criteria
E (Excellent): Strength of 5 N/15 mm or greater
G (Good): 3 N/15 mm to less than 5 N/15 mm
M (Marginal): 1 N/15 mm to less than 3 N/15 mm
P (Poor): less than 1 N/15 mm Evaluation of Image Density An inkjet printer (IPSiO GXe5500, manufactured by Ricoh Company Ltd.) was filled with each prepared ink and the liquid composition was preliminarily applied to an OPP film (PYLEN® P2102, manufactured by TOYOBO CO., LTD.) by bar coater No. 1 and the OPP film was dried. Thereafter, a solid image of 1,200 dpi×1,200 dpi was printed on the OPP film using the ink (black). Subsequent to drying, concentration at the solid portion was measured and evaluated according to the following criteria. E (Excellent) and G (Good) are allowable.

Evaluation Criteria
E (Excellent): Image density of 2.0 or greater
G (Good): Image density of from 1.5 to less than 2.0
M (Marginal): Image density of from 1.0 to less than 1.5
P (Poor): Image density of less than 1.0

Evaluation on Crushed Negative Character

An inkjet printer (IPSiO GXe5500, manufactured by Ricoh Company Ltd.) was filled with each prepared ink and the liquid composition was preliminarily applied to an OPP film (PYLEN® P2102, manufactured by TOYOBO CO., LTD.) by bar coater No. 1 and the OPP film was dried. Thereafter, an outline character chart of Gothic font was printed on the OPP film using the ink (black ink) under the condition shown in Table 4 and thereafter dried.

Illegibility of the characters of the thus-obtained image was visually checked and evaluated according to the following criteria. S (Super), E (Excellent) and G (Good) are allowable.

Evaluation Criteria

S (Super): 2 pt Gothic font legible
E (Excellent): 2 pt Gothic font not legible but 3 pt Gothic font legible
G (Good): 3 pt Gothic font not legible but 4 pt Gothic font legible
M (Marginal): 4 pt Gothic font not legible but 5 pt Gothic font legible
P (Poor): 5 pt Gothic font not legible With regard to the ink set Examples 42, 43, and 46 using the color ink, a Gothic outline character chart was printed using only the color ink and illegibility of the characters was evaluated in the same manner as in the case of the black ink. The evaluation result was the same as that of the black ink.

Evaluation on Abrasion Resistance

An inkjet printer (IPSiO GXe5500, manufactured by Ricoh Company Ltd.) was filled with each prepared ink and the liquid composition was preliminarily applied to an OPP film (PYLEN® P2102, manufactured by TOYOBO CO., LTD.) by bar coater No. 1 and the OPP film was dried. Thereafter, a solid image was printed on the OPP film using the ink under the condition shown in Table 4 and thereafter dried. When using black ink and color ink, a mixed color solid image was printed.

Thereafter, the solid portion was abraded by dried cotton (unbleached muslin No. 3) with a load of 400 g and evaluated about abrasion (friction) resistance according to the following criteria. E (Excellent) and G (Good) are allowable.

Evaluation Criteria

E (Excellent): No change in image when abraded 100+ times
G (Good): Slight scratch observed when abraded 100 times but causing no impact on image density
M (Marginal): Image density lowered when abraded 100 times
P (Poor): Image density lowered when abraded 50- times Evaluation on Drying Property An inkjet printer (IPSiO GXe5500, manufactured by Ricoh Company Ltd.) was filled with each prepared ink and the liquid composition was preliminarily applied to an OPP film (PYLEN® P2102, manufactured by TOYOBO CO., LTD.) by bar coater No. 1 and the OPP film was dried. Thereafter, a solid image was printed on the OPP film under the condition shown in Table 4 using the ink and dried at 25 degrees C. for a predetermined period of time. When using black ink and color ink, a mixed color solid image was printed.

Filter paper was pressed against the solid portion after drying and the drying property was evaluated checking the degree of ink transfer to the filter paper according to the following criteria. E (Excellent) and G (Good) are allowable.

E (Excellent): Transfer of ink to filter paper stops on drying condition of 25 degrees C. for 15 minutes
G (Good): Transfer of ink to filter paper stops on drying condition of 25 degrees C. for 30 minutes
M (Marginal): Transfer of ink to filter paper stops on drying condition of 25 degrees C. for 60 minutes
P (Poor): Transfer of ink to filter paper continues after drying at 60 degrees C. for 60 minutes Evaluation on Color Gamut An inkjet printer (IPSiO GXe5500, manufactured by Ricoh Company Ltd.) was filled with each prepared ink of the ink set Examples 42, 43, and 46 and the liquid composition was preliminarily applied to an OPP film (PYLEN® P2102, manufactured by TOYOBO CO., LTD.) by bar coater No. 1 and the OPP film was dried. Thereafter, a color chart image of 1,200 dpi×1,200 dpi was printed on the OPP film and thereafter dried.

Thereafter, the color chart image was measured using a color measuring tool (Xrite exact, manufactured by Xrite). Base on $L^*$ value, $a^*$ value, and $b^*$ value of each ink set, gamut volume was calculated and evaluated according to the following criteria. E (Excellent) and G (Good) are allowable.

Evaluation Criteria

E (Excellent): Gamut value is 300,000 or greater
G (Good): Gamut value is 200,000 to less than 300,000
P (Poor): Gamut value is less than 200,000

Evaluation on Sedimentation of White Ink

Sedimentation of the hollow particle of the prepared ink and the pigment was evaluated using turbiscan (MA2000, manufactured by EKO Instruments).

The ink was subject to ultrasonic dispersion treatment (100 W, 40 minutes) to be uniformized and thereafter 5.5 mL of the ink was charged in a glass cell specialized for the device using a pipette.

30 minutes later at which the liquid surface of the ink in the cell was stabilized, the measuring was conducted. This point in time was determined as the initiation of sedimentation evaluation.

Thereafter, the ink was left still at 23 degrees C. and kept measured until 120 hours later. Sedimentation was checked and indicated by deviation display using the initiation of sedimentation evaluation as reference. Sedimentation was mainly checked by quantity survey (relative value mode) of the peaks representing changes of backscattered light due to production of supernatent and evaluated according to the following criteria.

A: Relative change of backscattered light 120 hours after the initiation of evaluation is less than 5 percent
B: Relative change of backscattered light 120 hours after the initiation of evaluation is 5 percent to less than 10 percent
C: Relative change of backscattered light 120 hours after the initiation of evaluation is 10 percent or greater

TABLE 4

|  |  | Ink set Example 1 | Ink set Example 2 | Ink set Example 3 | Ink set Example 4 | Ink set Example 5 | Ink set Example 6 | Ink set Example 7 |
| --- | --- | --- | --- | --- | --- | --- | --- | --- |
| Used liquid | Liquid composition | Example 1 | Example 2 | Example 3 | Example 4 | Example 5 | Example 6 | Example 7 |
|  | Ink | Preparation Example 1 | Preparation Example 2 | Preparation Example 3 | Preparation Example 4 | Preparation Example 1 | Preparation Example 2 | Preparation Example 1 |

TABLE 4-continued

| | | | | | | | | |
|---|---|---|---|---|---|---|---|---|
| Condition | Ink R/P | 1.75 | 0.50 | 2.00 | 1.50 | 1.75 | 0.50 | 1.75 |
| | Ink resin particle Tg2 | 41 degrees C. | 12 degrees C. | 50 degrees C. | 67 degrees C. | 41 degrees C. | 12 degrees C. | 41 degrees C. |
| | Liquid composition nonionic resin particle Tg1 | 0 degrees C. | 0 degrees C. | −25 degrees C. | 9 degrees C. | 20 degrees C. | 25 degrees C. | −1 degrees C. |
| | Surface reforming treatment of printed matter | Corona | Corona | Corona | Corona | Corona | Plasma | Corona |
| | Heating after Ink discharging | 80 degrees C. for 2 minutes | 80 degrees C. for 2 minutes | 80 degrees C. for 2 minutes | 80 degrees C. for 2 minutes | 80 degrees C. for 2 minutes | 80 degrees C. for 2 minutes | 80 degrees C. for 2 minutes |
| | Attached amount of liquid composition (g/m$^2$) | 1.4 | 1.4 | 1.4 | 1.4 | 1.4 | 1.4 | 1.4 |
| | Attached amount of ink (g/m$^2$) | 10 | 6 | 4 | 10 | 13 | 14 | 10 |
| Evaluation Results | Evaluation of printed site lamination strength (OPP) | E | E | E | E | E | E | G |
| | Image Density | E | E | E | E | E | E | E |
| | Crushed negative character | E | E | E | E | E | E | E |
| | Abrasion resistance | E | E | E | E | E | E | G |
| | Drying property | E | E | E | E | E | E | E |

| | | Ink set Example 8 | Ink set Example 9 | Ink set Example 10 | Ink set Example 11 | Ink set Example 12 | Ink set Example 13 |
|---|---|---|---|---|---|---|---|
| Used liquid | Liquid composition | Example 8 | Example 9 | Example 10 | Example 11 | Example 12 | Example 13 |
| | Ink | Preparation Example 1 | Preparation Example 1 | Preparation Example 1 | Preparation Example 1 | Preparation Example 1 | Preparation Example 1 |
| | Ink R/P | 1.75 | 1.75 | 1.75 | 1.75 | 1.75 | 1.75 |
| | Ink resin particle Tg2 | 41 degrees C. | 41 degrees C. | 41 degrees C. | 41 degrees C. | 41 degrees C. | 41 degrees C. |
| | Liquid composition nonionic resin particle Tg1 | 0 degrees C. | 0 degrees C. | 0 degrees C. | 0 degrees C. | 0 degrees C. | 0 degrees C. |
| Condition | Surface reforming treatment of printed matter | Corona | Corona | Corona | Corona | Corona | Corona |
| | Heating after Ink discharging | 80 degrees C. for 2 minutes | 80 degrees C. for 2 minutes | 80 degrees C. for 2 minutes | 80 degrees C. for 2 minutes | 80 degrees C. for 2 minutes | 80 degrees C. for 2 minutes |
| | Attached amount of liquid composition (g/m$^2$) | 1.4 | 1.4 | 1.4 | 1.4 | 1.4 | 1.4 |
| | Attached amount of ink (g/m$^2$) | 10 | 10 | 10 | 10 | 10 | 10 |
| Evaluation Results | Evaluation of printed site lamination strength (OPP) | G | E | E | G | G | E |

TABLE 4-continued

|  |  | | | | | | |
|---|---|---|---|---|---|---|---|
|  | Image Density | E | E | E | E | E | G |
|  | Crushed negative character | E | G | G | E | E | G |
|  | Abrasion resistance | G | E | E | G | E | G |
|  | Drying property | E | E | E | E | E | E |

|  |  | Ink set Example 14 | Ink set Example 15 | Ink set Example 16 | Ink set Example 17 | Ink set Example 18 | Ink set Example 19 |
|---|---|---|---|---|---|---|---|
| Used liquid | Liquid composition | Example 14 | Example 15 | Example 16 | Example 1 | Example 1 | Example 1 |
|  | Ink | Preparation Example 1 | Preparation Example 1 | Preparation Example 1 | Preparation Example 5 | Preparation Example 6 | Preparation Example 7 |
|  | Ink R/P | 1.75 | 1.75 | 1.75 | — | 1.75 | 1.75 |
|  | Ink resin particle Tg2 | 41 degrees C. | 41 degrees C. | 41 degrees C. | — | 41 degrees C. | 41 degrees C. |
|  | Nonionic Resin Particle of liquid composition Tg1 | 0 degrees C. | −30 degrees C. | 30 degrees C. | 0 degrees C. | 0 degrees C. | 0 degrees C. |
| Condition | Substrate surface modifying treatment | Corona | Corona | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 | 1.4 |
|  | Attached amount of ink (g/m$^2$) | 10 | 10 | 10 | 10 | 10 | 10 |
| Evaluation Results | Evaluation of printed site lamination strength (OPP) | G | E | G | G | E | G |
|  | Image Density | E | E | E | G | E | G |
|  | Crushed negative character | E | E | E | E | G | E |
|  | Abrasion resistance | G | G | E | G | E | G |
|  | Drying Property | E | E | E | E | G | E |

|  |  | Ink set Example 20 | Ink set Example 21 | Ink set Example 22 | Ink set Example 23 | Ink set Example 24 | Ink set Example 25 |
|---|---|---|---|---|---|---|---|
| Used liquid | Liquid composition | Example 1 | Example 1 | Example 1 | Example 1 | Example 1 | Example 6 |
|  | Ink | Preparation Example 8 | Preparation Example 9 | Preparation Example 10 | Preparation Example 11 | Preparation Example 12 | Preparation Example 13 |
|  | Ink R/P | 1.75 | 1.75 | 0.40 | 3.10 | 1.75 | 1.75 |
|  | Ink resin particle Tg2 | 42 degrees C. | 65 degrees C. | 41 degrees C. | 41 degrees C. | −10 degrees C. | 25 degrees C. |
|  | Nonionic Resin Particle of liquid composition Tg1 | 0 degrees C. | 0 degrees C. | 0 degrees C. | 0 degrees C. | 0 degrees C. | 25 degrees C. |
| Condition | Substrate surface modifying treatment | Corona | Corona | Corona | Corona | Corona | Corona |

TABLE 4-continued

|  |  |  |  |  |  |  |  |
|---|---|---|---|---|---|---|---|
|  | Heating after Ink discharging | 80 degrees C. for 2 minutes | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m²) | 1.4 | 1.4 | 1.4 | 1.4 | 1.4 | 1.4 |
|  | Attached amount of ink (g/m²) | 10 | 10 | 10 | 10 | 10 | 10 |
| Evaluation Results | Evaluation of printed site lamination strength (OPP) | G | G | G | G | E | G |
|  | Image Density | G | G | G | E | E | E |
|  | Crushed negative character | E | E | E | G | E | E |
|  | Abrasion resistance | G | G | G | E | G | G |
|  | Drying Property | E | E | E | G | E | E |

|  |  | Ink set Example 26 | Ink set Example 27 | Ink set Example 28 | Ink set Example 29 |
|---|---|---|---|---|---|
| Used liquid | Liquid composition | Example 1 | | | |
|  | Ink | Preparation Example 1 | | | |
|  | Ink R/P | 1.75 | 1.75 | 1.75 | 1.75 |
|  | Ink resin particle Tg2 | 41 degrees C. | 41 degrees C. | 41 degrees C. | 41 degrees C. |
|  | Nonionic Resin Particle of liquid composition Tg1 | 0 degrees C. | 0 degrees C. | 0 degrees C. | 0 degrees C. |
| Condition | Substrate surface modifying treatment | Non-treated | Corona | Corona | Corona |
|  | Heating after Ink discharging | 80 degrees C. for 2 minutes | Non-heated | 80 degrees C. for 2 minutes | 80 degrees C. for 2 minutes |
|  | Attached amount of liquid composition (g/m²) | 1.4 | 1.4 | 0.3 | 2.3 |
|  | Attached amount of ink (g/m²) | 10 | 10 | 10 | 10 |
| Evaluation Results | Evaluation of printed site lamination strength (OPP) | G | G | E | G |
|  | Image Density | E | E | E | G |
|  | Crushed negative character | E | E | G | E |
|  | Abrasion resistance | E | G | E | G |
|  | Drying Property | E | E | E | G |

|  |  | Ink set Example 30 | Ink set Example 31 | Ink set Example 32 | Ink set Example 33 |
|---|---|---|---|---|---|
| Used liquid | Liquid composition | | | | |
|  | Ink | | | | |
|  | Ink R/P | 1.75 | 1.75 | 1.75 | 1.75 |
|  | Ink resin particle Tg2 | 41 degrees C. | 41 degrees C. | 41 degrees C. | 41 degrees C. |
|  | Nonionic Resin Particle of liquid composition Tg1 | 0 degrees C. | 0 degrees C. | 0 degrees C. | 0 degrees C. |
| Condition | Substrate surface modifying treatment | Corona | Corona | Corona | Corona |
|  | Heating after Ink discharging | 80 degrees C. for 2 minutes | 80 degrees C. for 2 minutes | 80 degrees C. for 2 minutes | 80 degrees C. for 2 minutes |
|  | Attached amount of liquid composition (g/m²) | 1.4 | 1.4 | 0.4 | 2.0 |
|  | Attached amount of ink (g/m²) | 3 | 15 | 10 | 10 |
| Evaluation Results | Evaluation of printed site lamination strength (OPP) | E | E | E | E |
|  | Image Density | G | E | E | E |
|  | Crushed negative character | E | G | E | E |

TABLE 4-continued

|  |  | | | | |
|---|---|---|---|---|---|
|  | Abrasion resistance | G | E | E | E |
|  | Drying Property | E | G | E | E |

|  |  | Ink set Example 34 | Ink set Example 35 | Ink set Example 36 | Ink set Example 37 | Ink set Example 38 |
|---|---|---|---|---|---|---|
| Used liquid | Liquid composition | Example 1 | Example 1 | Example 1 | Example 1 | Example 1 |
|  | Ink | Preparation Example 14 | Preparation Example 15 | Preparation Example 16 | Preparation Example 17 | Preparation Example 18 |
|  | Ink R/P | 1.75 | 1.75 | 1.75 | 1.75 | 1.75 |
|  | Ink resin particle Tg2 | 41 degrees C. | 41 degrees C. | 41 degrees C. | 41 degrees C. | 41 degrees C. |
|  | Nonionic Resin Particle of liquid composition Tg1 | 0 degrees C. | 0 degrees C. | 0 degrees C. | 0 degrees C. | 0 degrees C. |
| Condition | Substrate surface modifying treatment | Corona | Corona | Corona | Corona | Corona |
|  | Heating after Ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 10 | 10 | 10 | 10 | 10 |
| Evaluation Results | Evaluation of printed site lamination strength (OPP) | E | E | E | E | E |
|  | Image Density | E | E | E | E | E |
|  | Crushed negative character | E | E | E | E | E |
|  | Abrasion resistance | E | E | E | E | E |
|  | Drying Property | E | E | E | E | E |

|  |  | Ink set Example 39 | Ink set Example 40 | Ink set Example 41 | Ink set Example 42 |
|---|---|---|---|---|---|
| Used liquid | Liquid composition | Example 1 | Example 1 | Example 1 | Example 1 |
|  | Black Ink | Preparation Example 1 | Preparation Example 1 | Preparation Example 1 | Preparation Example 1 |
|  | Color ink | — | — | — | Preparation Examples 22 to 24 |
|  | White Ink | Preparation Example 19 | Preparation Example 20 | Preparation Example 21 | Preparation Example 19 |
|  | Black Ink R/P | 1.75 | 1.75 | 1.75 | 1.75 |
|  | Black ink resin particle Tg2 | 41 degrees C. | 41 degrees C. | 41 degrees C. | 41 degrees C. |
|  | Color ink R/P | — | — | — | All 1.75 |
|  | Color ink resin particle Tg2 | — | — | — | All 41 degrees C. |
|  | White ink R/P | 1.00 | 1.00 | 1.00 | 1.00 |
|  | White ink resin particle Tg2 | 41 degrees C. | 41 degrees C. | 41 degrees C. | 41 degrees C. |
|  | Nonionic Resin Particle of liquid composition Tg1 | 0 degrees C. | 0 degrees C. | 0 degrees C. | 0 degrees C. |

TABLE 4-continued

|  |  |  |  |  |  |
|---|---|---|---|---|---|
| Condition | Substrate surface modifying treatment | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 |
|  | Attached amount of ink (g/m$^2$) | 10 | 10 | 10 | 10 |
| Evaluation Results | Evaluation of printed site lamination strength (OPP) | E | E | E | E |
|  | Image Density | E | G | G | E |
|  | Crushed negative character | E | E | E | E |
|  | Abrasion resistance | E | E | E | E |
|  | Drying Property | E | E | E | E |
|  | Color gamut | — | — | — | E |
| Evaluation of white Ink | Sedimentation of White Ink | B | B | B | B |

|  |  | Ink set Example 43 | Ink set Example 44 | Ink set Example 45 | Ink set Example 46 |
|---|---|---|---|---|---|
| Used liquid | Liquid composition | Example 1 | Example 1 | Example 1 | Example 1 |
|  | Black Ink | Preparation Example 1 | Preparation Example 1 | Preparation Example 1 | Preparation Example 1 |
|  | Color ink | Preparation Examples 22 to 24 | — | — | Preparation Examples 22 to 24 |
|  | White Ink | — | Preparation Example 25 | Preparation Example 26 | Preparation Example 25 |
|  | Black Ink R/P | 1.75 | 1.75 | 1.75 | 1.75 |
|  | Black ink resin particle Tg2 | 41 degrees C. | 41 degrees C. | 41 degrees C. | 41 degrees C. |
|  | Color ink R/P | All 1.75 | — | — | All 1.75 |
|  | Color ink resin particle Tg2 | All 41 degrees C. | — | — | All 41 degrees C. |
|  | White ink R/P | — | 1.00 | 1.00 | 1.00 |
|  | White ink resin particle Tg2 | — | 41 degrees C. | 41 degrees C. | 41 degrees C. |
|  | Nonionic Resin Particle of liquid composition Tg1 | 0 degrees C. | 0 degrees C. | 0 degrees C. | 0 degrees C. |
| Condition | Substrate surface modifying treatment | Corona | Corona | Corona | Corona |
|  | Heating after ink applying | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 |
|  | Attached amount of ink (g/m$^2$) | 10 | 10 | 10 | 10 |

TABLE 4-continued

|  |  | | | | |
|---|---|---|---|---|---|
| Evaluation Results | Evaluation of printed site lamination strength (OPP) | E | E | E | E |
|  | Image Density | G | E | E | E |
|  | Crushed negative character | E | E | E | E |
|  | Abrasion resistance | E | E | E | E |
|  | Drying Property | E | E | E | E |
|  | Color gamut | G | — | — | E |
| Evaluation of white Ink | Sedimentation of White Ink | — | A | A | A |

|  |  | Ink set Example 47 | Ink set Example 48 | Ink set Example 49 | Ink set Example 50 | Ink set Example 51 |
|---|---|---|---|---|---|---|
| Used liquid | Liquid composition | Example 29 | Example 30 | Example 31 | Example 32 | Example 33 |
|  | Ink | Preparation Example 2 | Preparation Example 3 | Preparation Example 4 | Preparation Example 1 | Preparation Example 2 |
|  | Ink R/P | 0.50 | 2.00 | 1.50 | 1.75 | 0.50 |
|  | Ink resin particle Tg2 | 12 degrees C. | 50 degrees C. | 67 degrees C. | 41 degrees C. | 12 degrees C. |
|  | Nonionic Resin Particle of liquid composition Tg1 | 0 degrees C. | −25 degrees C. | 9 degrees C. | 20 degrees C. | 25 degrees C. |
| Condition | Substrate surface modifying treatment | Corona | Corona | Corona | Corona | Plasma |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 6 | 4 | 10 | 13 | 14 |
| Evaluation Results | Evaluation of printed site lamination strength (OPP) | E | E | E | E | E |
|  | Image Density | E | E | E | E | E |
|  | Crushed negative character | S | S | S | S | S |
|  | Abrasion resistance | E | E | E | E | E |
|  | Drying Property | E | E | E | E | E |

|  |  | Ink set Example 52 | Ink set Example 53 | Ink set Example 54 | Ink set Example 55 | Ink set Example 56 |
|---|---|---|---|---|---|---|
| Used liquid | Liquid composition | Example 34 | Example 35 | Example 36 | Example 37 | Example 38 |
|  | Ink | Preparation Example 1 | Preparation Example 1 | Preparation Example 1 | Preparation Example 1 | Preparation Example 1 |
|  | Ink R/P | 1.75 | 1.75 | 1.75 | 1.75 | 1.75 |
|  | Ink resin particle Tg2 | 41 degrees C. | 41 degrees C. | 41 degrees C. | 41 degrees C. | 41 degrees C. |

TABLE 4-continued

|  |  |  |  |  |  |  |
|---|---|---|---|---|---|---|
|  | Nonionic Resin Particle of liquid composition Tg1 | −1 degrees C. | 0 degrees C. | 0 degrees C. | 0 degrees C. | 0 degrees C. |
| Condition | Substrate surface modifying treatment | Corona | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 10 | 10 | 10 | 10 | 10 |
| Evaluation Results | Evaluation of printed site lamination strength (OPP) | G | G | E | E | G |
|  | Image Density | E | E | E | E | E |
|  | Crushed negative character | S | S | E | E | S |
|  | Abrasion resistance | G | G | E | E | G |
|  | Drying Property | E | E | E | E | E |

|  |  | Ink set Example 57 | Ink set Example 58 | Ink set Example 59 | Ink set Example 60 | Ink set Example 61 |
|---|---|---|---|---|---|---|
| Used liquid | Liquid composition | Example 39 | Example 40 | Example 41 | Example 42 | Example 43 |
|  | Ink | Preparation Example 1 | Preparation Example 1 | Preparation Example 1 | Preparation Example 1 | Preparation Example 1 |
|  | Ink R/P | 1.75 | 1.75 | 1.75 | 1.75 | 1.75 |
|  | Ink resin particle Tg2 | 41 degrees C. | 41 degrees C. | 41 degrees C. | 41 degrees C. | 41 degrees C. |
|  | Nonionic Resin Particle of liquid composition Tg1 | 0 degrees C. | 0 degrees C. | 0 degrees C. | −30 degrees C. | 30 degrees C. |
| Condition | Substrate surface modifying treatment | Corona | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 10 | 10 | 10 | 10 | 10 |
| Evaluation Results | Evaluation of printed site lamination strength (OPP) | G | E | G | E | G |
|  | Image Density | E | G | E | E | E |
|  | Crushed negative character | S | E | S | S | S |

TABLE 4-continued

|  |  | | | | | |
|---|---|---|---|---|---|---|
|  | Abrasion resistance | E | G | G | G | E |
|  | Drying Property | E | E | E | E | E |

|  |  | Ink set Example 62 | Ink set Example 63 | Ink set Example 64 | Ink set Example 65 | Ink set Example 66 |
|---|---|---|---|---|---|---|
| Used liquid | Liquid composition | Example 10 | Example 10 | Example 10 | Example 10 | Example 10 |
|  | Ink | Preparation Example 5 | Preparation Example 6 | Preparation Example 7 | Preparation Example 8 | Preparation Example 9 |
|  | Ink R/P | — | 1.75 | 1.75 | 1.75 | 1.75 |
|  | Ink resin particle Tg2 | — | 41 degrees C. | 41 degrees C. | 42 degrees C. | 65 degrees C. |
|  | Nonionic Resin Particle of liquid composition Tg1 | 0 degrees C. | 0 degrees C. | 0 degrees C. | 0 degrees C. | 0 degrees C. |
| Condition | Substrate surface modifying treatment | Corona | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 10 | 10 | 10 | 10 | 10 |
| Evaluation Results | Evaluation of printed site lamination strength (OPP) | G | E | G | G | G |
|  | Image Density | G | E | G | G | G |
|  | Crushed negative character | S | E | S | S | S |
|  | Abrasion resistance | G | E | G | G | G |
|  | Drying Property | E | G | E | E | E |

|  |  | Ink set Example 67 | Ink set Example 68 | Ink set Example 69 | Ink set Example 70 | Ink set Example 71 |
|---|---|---|---|---|---|---|
| Used liquid | Liquid composition | Example 10 | Example 10 | Example 10 | Example 33 | Example 10 |
|  | Ink | Preparation Example 10 | Preparation Example 11 | Preparation Example 12 | Preparation Example 13 | Preparation Example 1 |
|  | Ink R/P | 0.40 | 3.10 | 1.75 | 1.75 | 1.75 |
|  | Ink resin particle Tg2 | 41 degrees C. | 41 degrees C. | −10 degrees C. | 25 degrees C. | 41 degrees C. |
|  | Nonionic Resin Particle of liquid composition Tg1 | 0 degrees C. | 0 degrees C. | 0 degrees C. | 25 degrees C. | 0 degrees C. |
| Condition | Substrate surface modifying treatment | Corona | Corona | Corona | Corona | Non-treated |

TABLE 4-continued

| | | | | | | |
|---|---|---|---|---|---|---|
| | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
| | Attached amount of liquid composition (g/m$^2$) | 1.4 | 1.4 | 1.4 | 1.4 | 1.4 |
| | Attached amount of ink (g/m$^2$) | 10 | 10 | 10 | 10 | 10 |
| Evaluation Results | Evaluation of printed site lamination strength (OPP) | G | G | E | G | G |
| | Image Density | G | E | E | E | E |
| | Crushed negative character | S | E | S | S | S |
| | Abrasion resistance | G | E | G | G | E |
| | Drying Property | E | G | E | E | E |

| | | Ink set Example 72 | Ink set Example 73 | Ink set Example 74 | Ink set Example 75 | Ink set Example 76 |
|---|---|---|---|---|---|---|
| Used liquid | Liquid composition | Example 10 | Example 10 | Example 10 | Example 10 | Example 10 |
| | Ink | Preparation Example 1 | Preparation Example 1 | Preparation Example 1 | Preparation Example 1 | Preparation Example 1 |
| | Ink R/P | 1.75 | 1.75 | 1.75 | 1.75 | 1.75 |
| | Ink resin particle Tg2 | 41 degrees C. | 41 degrees C. | 41 degrees C. | 41 degrees C. | 41 degrees C. |
| | Nonionic Resin Particle of liquid composition Tg1 | 0 degrees C. | 0 degrees C. | 0 degrees C. | 0 degrees C. | 0 degrees C. |
| Condition | Substrate surface modifying treatment | Corona | Corona | Corona | Corona | Corona |
| | Heating after ink discharging | Non-heated | 80 degrees C. for 2 minutes | 80 degrees C. for 2 minutes | 80 degrees C. for 2 minutes | 80 degrees C. for 2 minutes |
| | Attached amount of liquid composition (g/m$^2$) | 1.4 | 0.3 | 2.3 | 1.4 | 1.4 |
| | Attached amount of ink (g/m$^2$) | 10 | 10 | 10 | 3 | 15 |
| Evaluation Results | Evaluation of printed site lamination strength (OPP) | G | E | G | E | E |
| | Image Density | E | E | G | G | E |
| | Crushed negative character | S | E | S | S | E |
| | Abrasion resistance | G | E | G | G | E |
| | Drying Property | E | E | G | E | G |

TABLE 4-continued

|  |  | Ink set Example 77 | Ink set Example 78 | Ink set Example 79 | Ink set Example 80 | Ink set Example 81 |
|---|---|---|---|---|---|---|
| Used liquid | Liquid composition | Example 10 | Example 10 | Example 10 | Example 10 | Example 10 |
|  | Ink | Preparation Example 14 | Preparation Example 15 | Preparation Example 16 | Preparation Example 17 | Preparation Example 18 |
|  | Ink R/P | 1.75 | 1.75 | 1.75 | 1.75 | 1.75 |
|  | Ink resin particle Tg2 | 41 degrees C. | 41 degrees C. | 41 degrees C. | 41 degrees C. | 41 degrees C. |
|  | Nonionic Resin Particle of liquid composition Tg1 | 0 degrees C. | 0 degrees C. | 0 degrees C. | 0 degrees C. | 0 degrees C. |
| Condition | Substrate surface modifying treatment | Corona | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 10 | 10 | 10 | 10 | 10 |
| Evaluation Results | Evaluation of printed site lamination strength (OPP) | E | E | E | E | E |
|  | Image Density | E | E | E | E | E |
|  | Crushed negative character | S | S | S | S | S |
|  | Abrasion resistance | E | E | E | E | E |
|  | Drying Property | E | E | E | E | E |

|  |  | Ink set Example 82 | Ink set Example 83 | Ink set Example 84 | Ink set Example 85 | Ink set Example 86 |
|---|---|---|---|---|---|---|
| Used liquid | Liquid composition | Example 17 | Example 18 | Example 19 | Example 20 | Example 21 |
|  | Ink | Preparation Example 1 | Preparation Example 2 | Preparation Example 3 | Preparation Example 4 | Preparation Example 1 |
|  | Ink R/P | 1.75 | 0.50 | 2.00 | 1.50 | 1.75 |
|  | Ink resin particle Tg2 | 41 degrees C. | 12 degrees C. | 50 degrees C. | 67 degrees C. | 41 degrees C. |
|  | Nonionic Resin Particle of liquid composition Tg1 | 0 degrees C. | 0 degrees C. | −25 degrees C. | 9 degrees C. | 20 degrees C. |
| Condition | Substrate surface modifying treatment | Corona | Corona | Corona | Corona | Corona |
|  | Heating after ink discharging | 80 degrees C. for 2 minutes | 80 degrees C. for 2 minutes | 80 degrees C. for 2 minutes | 80 degrees C. for 2 minutes | 80 degrees C. for 2 minutes |
|  | Attached amount of liquid composition (g/m$^2$) | 1.4 | 1.4 | 1.4 | 1.4 | 1.4 |
|  | Attached amount of ink (g/m$^2$) | 10 | 6 | 4 | 10 | 13 |

TABLE 4-continued

| | | | | | | |
|---|---|---|---|---|---|---|
| Evaluation Results | Evaluation of printed site lamination strength (OPP) | E | E | E | E | E |
| | Image Density | E | E | E | E | E |
| | Crushed negative character | E | E | E | E | E |
| | Abrasion resistance | E | E | E | E | E |
| | Drying Property | E | E | E | E | E |

| | | Ink set Example 87 | Ink set Example 88 | Ink set Example 89 | Ink set Example 90 |
|---|---|---|---|---|---|
| Used liquid | Liquid composition | Example 22 | Example 23 | Example 24 | Example 25 |
| | Ink | Preparation Example 2 | Preparation Example 1 | Preparation Example 2 | Preparation Example 3 |
| | Ink R/P | 0.50 | 1.75 | 0.50 | 2.00 |
| | Ink resin particle Tg2 | 12 degrees C. | 41 degrees C. | 12 degrees C. | 50 degrees C. |
| | Nonionic Resin Particle of liquid composition Tg1 | 25 degrees C. | Combinational use with article having a Tg of −30-30 degrees C. | | |
| Condition | Substrate surface modifying treatment | Plasma | Corona | Corona | Corona |
| | Heating after ink discharging | 80 degrees C. for 2 minutes | 80 degrees C. for 2 minutes | 80 degrees C. for 2 minutes | 80 degrees C. for 2 minutes |
| | Attached amount of liquid composition (g/m$^2$) | 1.4 | 1.4 | 1.4 | 1.4 |
| | Attached amount of ink (g/m$^2$) | 14 | 10 | 6 | 4 |
| Evaluation Results | Evaluation of printed site lamination strength (OPP) | E | E | E | E |
| | Image Density | E | E | E | E |
| | Crushed negative character | E | E | E | E |
| | Abrasion resistance | E | E | E | E |
| | Drying Property | E | E | E | E |

| | | Ink set Example 91 | Ink set Example 92 | Ink set Example 93 |
|---|---|---|---|---|
| Used liquid | Liquid composition | Example 26 | Example 27 | Example 28 |
| | Ink | Preparation Example 4 | Preparation Example 1 | Preparation Example 2 |
| | Ink R/P | 1.50 | 1.75 | 0.50 |
| | Ink resin particle Tg2 | 67 degrees C. | 41 degrees C. | 12 degrees C. |
| | Nonionic Resin Particle of liquid composition Tg1 | Combinational use with article having a Tg of −30-30 degrees C. | | |
| Condition | Substrate surface modifying treatment | Corona | Corona | Plasma |

TABLE 4-continued

|  |  | | | |
|---|---|---|---|---|
|  | Heating after ink discharging | 80 degrees C. for 2 minutes | 80 degrees C. for 2 minutes | 80 degrees C. for 2 minutes |
|  | Attached amount of liquid composition (g/m²) | 1.4 | 1.4 | 1.4 |
|  | Attached amount of ink (g/m²) | 10 | 13 | 14 |
| Evaluation Results | Evaluation of printed site lamination strength (OPP) | E | E | E |
|  | Image Density | E | E | E |
|  | Crushed negative character | E | E | E |
|  | Abrasion resistance | E | E | E |
|  | Drying Property | E | E | E |

|  |  | Ink set Comparative Example 1 | Ink set Comparative Example 2 | Ink set Comparative Example 3 |
|---|---|---|---|---|
| Used liquid | Liquid composition | Comparative Example 1 | Comparative Example 2 | Comparative Example 3 |
|  | Ink | Preparation Example 1: | Preparation Example 2: | Preparation Example 3: |
| Evaluation Results | Printed site laminate evaluation (OPP) | — | M | M |
|  | Image Density | — | E | G |
|  | Crushed negative character | — | E | E |
|  | Abrasion resistance | — | P | P |
|  | Drying Property | — | E | E |

|  |  | Ink set Comparative Example 4 | Ink set Comparative Example 5 | Ink set Comparative Example 6 |
|---|---|---|---|---|
| Used liquid | Liquid composition | Comparative Example 4 | Comparative Example 5 | Comparative Example 6 |
|  | Ink | Preparation Example 4: | Preparation Example 5: | Preparation Example 6: |
| Evaluation Results | Printed site laminate evaluation (OPP) | G | E | E |
|  | Image Density | M | E | E |
|  | Crushed negative character | E | M | P |
|  | Abrasion resistance | M | E | E |
|  | Drying Property | E | E | E |

Having now fully described embodiments of the present invention, it will be apparent to one of ordinary skill in the art that many changes and modifications can be made thereto without departing from the spirit and scope of embodiments of the invention as set forth herein.

What is claimed is:

1. A surface treatment liquid composition for a substrate, the composition comprising:
   a nonionic resin particle;
   a multivalent metal salt; and
   an organic solvent comprising at least one of 1,2-propanediol, 1,2-butanediol and 2,3-butanediol.

2. The surface treatment liquid composition according to claim 1, wherein the nonionic resin particle comprises at least one of a polyolefin resin, a polyvinyl acetate resin, a polyvinyl chloride resin, a urethane resin, a styrene butadiene resin, and a copolymer thereof.

3. The surface treatment liquid composition according to claim 1, wherein the multivalent metal salt comprises at least one of an aluminum salt, a calcium salt, a magnesium salt, and a nickel salt.

4. The surface treatment liquid composition according to claim 1, wherein the multivalent metal salt comprises an aluminum salt selected from the group consisting of aluminum sulfate, aluminum phosphate, polyaluminum chloride, and aluminum potassium sulfate.

5. The surface treatment liquid composition according to claim 1, wherein the nonionic resin particle accounts for 0.5-20 percent by mass of the surface treatment liquid composition.

6. A recording device, comprising:
   a pre-processing fluid comprising the surface treatment liquid composition of claim 1; and
   an ink discharging head configured to discharge one or more inks, each ink comprising a coloring material.

7. The recording device according to claim 6, wherein the one or more inks comprise a non-white coloring material having a volume average particle diameter of from 30 to 110 nm and a thermoplastic resin particle.

8. The recording device according to claim 6, wherein the one or more inks comprise a white coloring material and a thermoplastic resin particle.

9. The recording device according to claim 6, wherein the one or more inks comprise:
a non-white ink comprising a non-white coloring material having a volume average particle diameter of from 30 to 110 nm and a thermoplastic resin particle, and
a white ink comprising a white coloring material and a thermoplastic resin particle.

10. The recording device according to claim 9, wherein at least one ink of the non-white ink and the white ink has a ratio (R/P) of a mass ratio (R) of the thermoplastic resin particle to the at least one ink of the non-white ink and the white ink to a mass ratio (P) of the coloring material to the at least one ink of the non-white ink and the white ink is 0.5-3.0.

11. The recording device according to claim 7, wherein a glass transition temperature Tg1 of the nonionic resin particle of the surface treatment liquid composition is lower than a glass transition temperature Tg2 of the resin particle of the ink.

12. A recording method, comprising:
applying the surface treatment liquid composition of claim 1 to a substrate; and
printing by discharging the one or more inks to the substrate.

13. The recording method according to claim 12, further comprising:
reforming a surface of the substrate by at least one method selected from the group consisting of a corona treatment method, an atmospheric pressure plasma processing method, a frame processing method and an ultraviolet irradiation processing method.

14. The recording method according to claim 12, wherein:
the one or more inks are discharged by an ink discharging head, the ink discharging head including a nozzle configured to discharge the one or more inks, a plurality of individual liquid chambers communicating with the nozzle, a flow-in path configured to flow the one or more inks into the individual liquid chambers, and a flow-out path configured to flow the one or more inks out of the individual liquid chambers; and
the printing further comprises circulating the one or more inks from the flow-out path to the flow-in path.

15. The recording device according to claim 6, wherein the ink discharging head includes a nozzle configured to discharge the one or more inks, a plurality of individual liquid chambers communicating with the nozzle, a flow-in path configured to flow the one or more inks into the individual liquid chambers, a flow-out path configured to flow the one or more inks out of the individual liquid chambers, and a circulating device configured to circulate the one or more inks from the flow-out path to the flow-in path.

16. The recording method of claim 12, wherein the substrate has a water-absorption amount of 10 mL/m$^2$ or less between the contact and 30 msec$^{1/2}$ after the contact according to the Bristow method.

17. The surface treatment liquid composition of claim 1, wherein the multivalent metal salt comprises aluminum sulfate.

18. The surface treatment liquid composition of claim 1, wherein the multivalent metal salt is a trivalent metal salt.

19. The surface treatment liquid composition of claim 1, wherein the multivalent metal salt comprises phosphate.

* * * * *

UNITED STATES PATENT AND TRADEMARK OFFICE
CERTIFICATE OF CORRECTION

PATENT NO. : 10,259,965 B2
APPLICATION NO. : 15/436256
DATED : April 16, 2019
INVENTOR(S) : Tomohiro Nakagawa et al.

It is certified that error appears in the above-identified patent and that said Letters Patent is hereby corrected as shown below:

On the Title Page

Item (54), and in the Specification, Column 1, Lines 1-3, the Title is incorrect. It should read:
-- SURFACE TREATMENT LIQUID COMPOSITION, INK SET, RECORDING METHOD, AND RECORDING DEVICE --

Signed and Sealed this
Eighteenth Day of June, 2019

Andrei Iancu
*Director of the United States Patent and Trademark Office*